(12) United States Patent
Fiorini

(10) Patent No.: US 7,543,842 B1
(45) Date of Patent: Jun. 9, 2009

(54) PORTABLE AND ADJUSTABLE TRAILER ASSEMBLY AND METHOD OF USE THEREOF

(76) Inventor: Raymond Fiorini, 126 S. East Ave., Oak Park, IL (US) 60302

( * ) Notice: Subject to any disclaimer, the term of this patent is extended or adjusted under 35 U.S.C. 154(b) by 0 days.

(21) Appl. No.: 12/072,023

(22) Filed: Feb. 22, 2008

(51) Int. Cl.
B62B 5/00 (2006.01)
(52) U.S. Cl. .......................... 280/656; 280/639; 280/43
(58) Field of Classification Search ................. 280/656, 280/43, 46, 37, 639, 42, 651, 652
See application file for complete search history.

(56) References Cited

U.S. PATENT DOCUMENTS

| | | | | |
|---|---|---|---|---|
| 3,612,600 | A * | 10/1971 | Salichs | .................... 296/181.7 |
| 4,230,340 | A * | 10/1980 | Wasservogel | ................ 280/656 |
| 4,522,425 | A * | 6/1985 | Cornwall et al. | ............. 280/656 |
| 4,746,142 | A * | 5/1988 | Davis | .......................... 280/656 |
| 5,340,134 | A * | 8/1994 | Dodson | ........................ 280/37 |
| 5,480,180 | A * | 1/1996 | Fuller et al. | .................. 280/656 |
| 6,164,683 | A * | 12/2000 | Kalman | ....................... 280/656 |
| 6,585,285 | B2 * | 7/2003 | Koch | ............................ 280/656 |
| 6,773,025 | B1 * | 8/2004 | Zelm | ........................... 280/656 |
| 6,869,095 | B2 * | 3/2005 | Roll et al. | ................. 280/491.3 |
| 7,059,626 | B2 * | 6/2006 | Koch | ........................... 280/656 |
| 7,150,466 | B1 * | 12/2006 | Chapman et al. | ............ 280/656 |
| 2003/0102655 | A1 | 6/2003 | Thompson | |
| 2005/0093273 | A1 | 5/2005 | McDonnell | |
| 2007/0001431 | A1 * | 1/2007 | Fiorini | ........................ 280/656 |

* cited by examiner

Primary Examiner—Christopher P Ellis
Assistant Examiner—Brian Swenson
(74) Attorney, Agent, or Firm—Robert C. Montgomery

(57) ABSTRACT

Disclosed is a portable and adjustable trailer assembly that allows for easy assembling and de-assembling, foldability, portability, requiring small storage space, multi-functional utility, retrofittable to various vehicles, and at the same time light weight and cost effective. It comprises a frame assembly having a frame portion with front and rear ends, pivotally and hingedly coupled at its rear end to a first end of a platform portion, a second end of the platform portion coupled to a rear beam, the portions being releaseably locked with each other and folds out to configure a lateral plane when in operation, a wheel assembly mechanically coupled to the platform portion at its underneath; and a detachable and lockable drawbar assembly having first and second ends, mechanically coupled to the frame assembly at the first end and having means to connect to a tow vehicle at the second end.

19 Claims, 16 Drawing Sheets

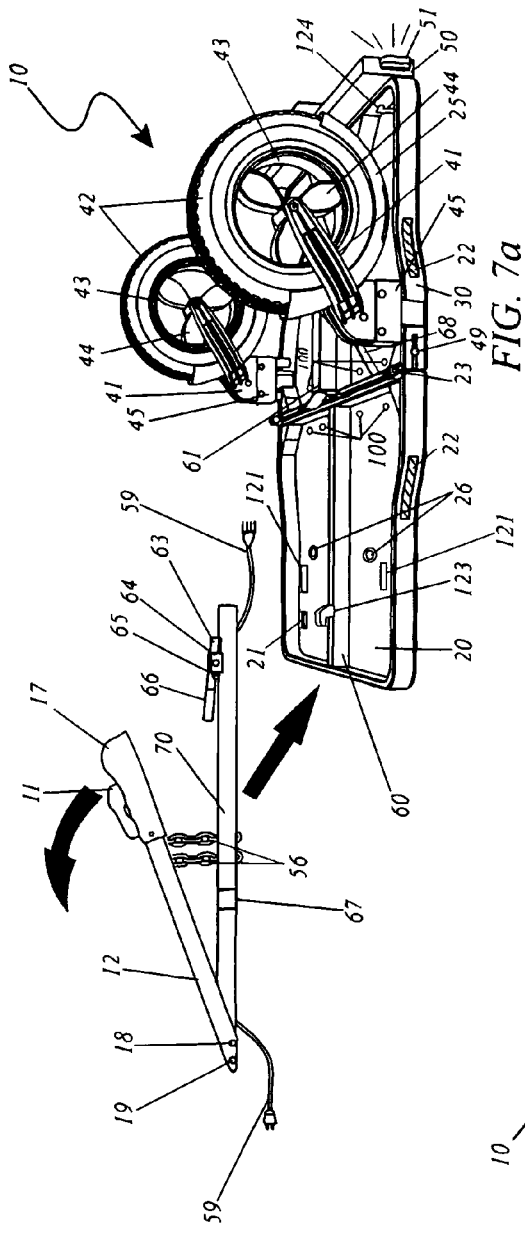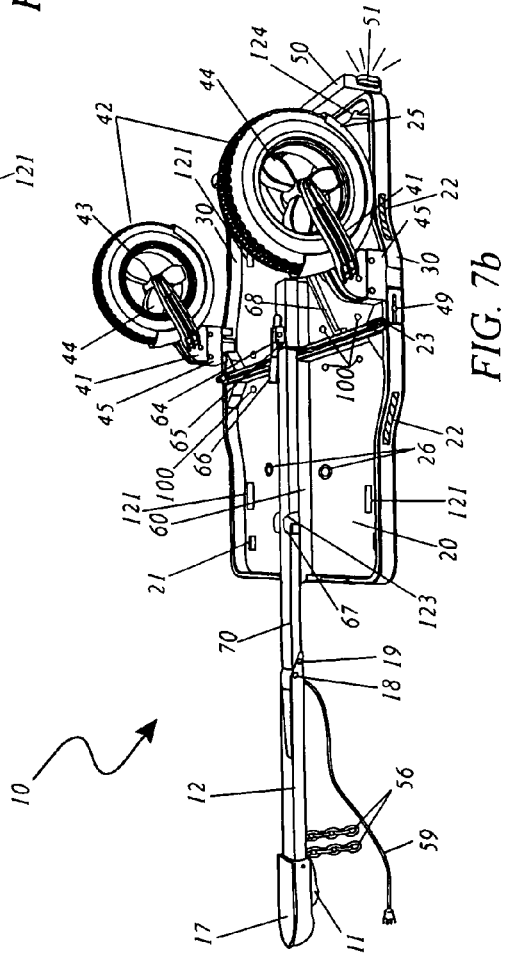
FIG. 7a
FIG. 7b

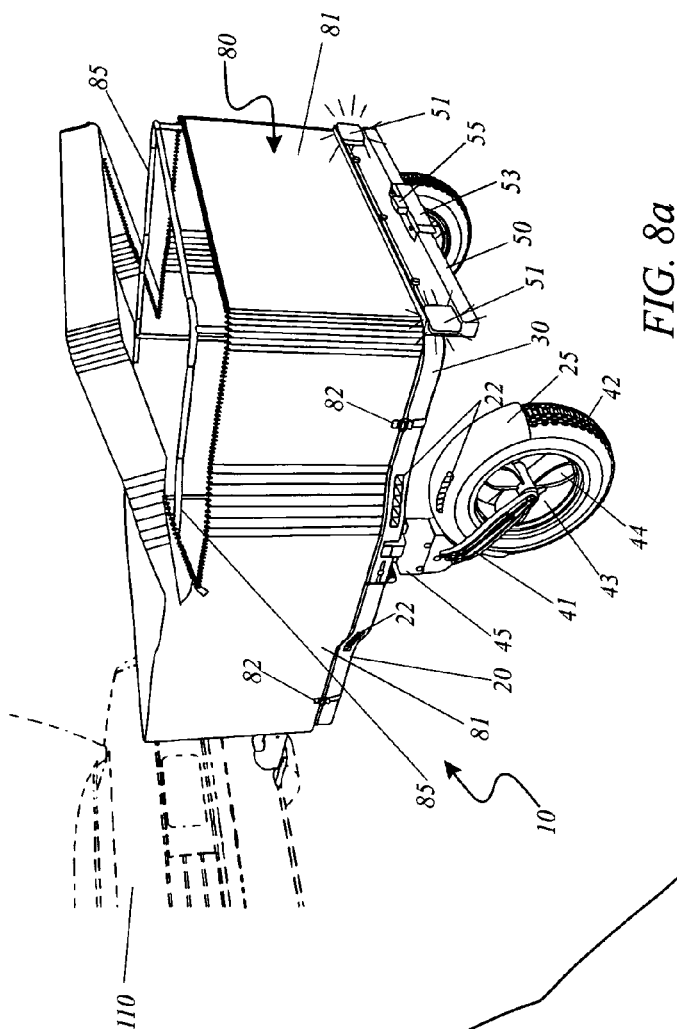
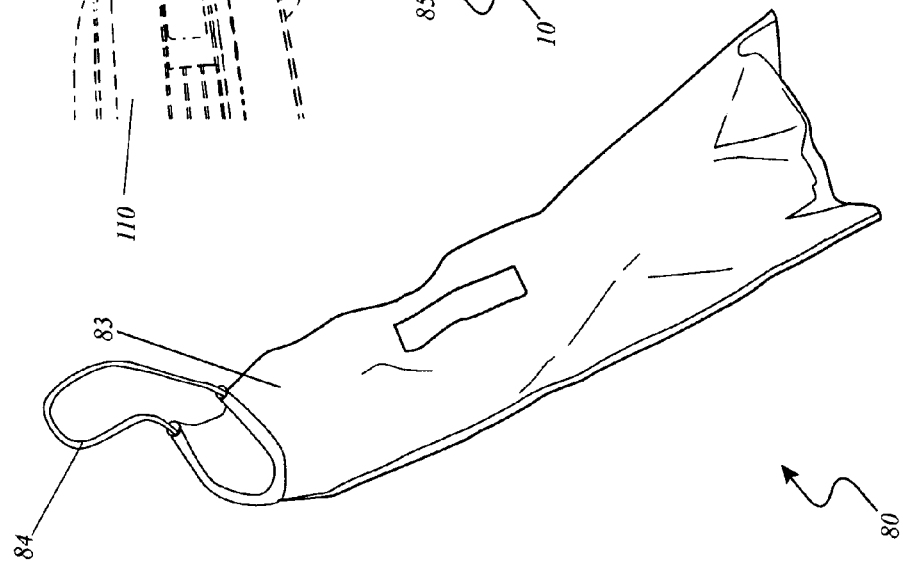
FIG. 8a
FIG. 8b

PORTABLE AND ADJUSTABLE TRAILER ASSEMBLY AND METHOD OF USE THEREOF

FIELD OF THE INVENTION

The present invention relates to wheel trailers and more particularly relates to a portable and adjustable trailer assembly with multifunction removable drawbars that can be easily assembled and de-assembled to a foldable format to be transported with comfort.

BACKGROUND OF THE INVENTION

Trailers of the type having a platform surface, generally has at least one pair of wheels with, an axle and suspension, and the wheels are commonly used for commercial and domestic transportation purposes to carry a wide variety of goods; from one place to another, and typically pulled behind a car, truck, van, motorcycle or the like. Most often trailers are rented or are purchased outright. There are several problems associated with renting or owning a trailer. If the trailer is rented, one must first drive to the rental agency with the towing vehicle, upon which time the empty trailer will be attached to the towing vehicle. One will then drive the towing vehicle either home or to the destination of where one is picking up the items to be moved. The first problem is that one is towing an empty trailer which is hard to drive in traffic as it is low in height and not easily visible. Since it is not loaded, it is light and tends to hop and jump around, especially on rough roads or when hitting a hole or bump. This is a dangerous situation as one can lose control of the trailer resulting in a possible accident involving the trailer and the tow vehicle.

Once again after the item is delivered the empty trailer has to be returned to the rental agency. If the trailer is owned, one has to again return home or go to the place to pickup the item with an empty trailer, entailing an additional problem of its storage after use. In a house the garage ideally would serve as a storage place for most large trailers as storing the trailer outside would invite objections from communities. It has been observed that most people already have their garage full of lawn equipment, snow blowers, lawnmowers etc. and to store a trailer might be difficult, if not impossible. The normal trailer is a single unit, and is usually just a flat bed.

Many attempts have been made to address the above-mentioned issues relating to vehicle trailers, and to develop a trailer assembly that meet the requirements of portability, adaptability, retrofittability and transportability.

US Patent Publication No. 20030102655 discloses a folding with pivotally connected front, main and rear sections movable from an unfolded condition to a folded condition, in which the rear section pivots two hundred seventy degrees (270°) to lie atop the main section, and the front section pivots ninety degrees (90°) to nest within the main section. This provides a folded compact arrangement approximately forty-eight (48) by eighty (80) inches. When unfolded, the trailer produces an inside dimension of approximately sixty (60) by ninety-six (96) inches enabled by the front section thin walls that are interiorly nearly as wide as the main and rear sections. An extensible handle facilitates folding and unfolding the rear section. This patent is configurationally different from the present invention and does not address the above-cited issues in an effective manner.

U.S. Patent No. 20050093273 discloses a trailer assembly including a bed sub-assembly having a plurality of sections movably coupled to one another for permitting movement between an extended configuration and a folded configuration. In the folded configuration, the plurality of sections collectively form a bottom surface, an upper surface, and surrounding side walls of an enclosable compartment, at least one of the sections having an access member movable between an open position for permitting access to the compartment and a closed position for enclosing the compartment as the sections are maintained in the folded configuration. The trailer assembly optionally may include a wheel subassembly and drawbar, which may be freely and independently rotatable relative to one another and the bed sub-assembly. The configurational aspects of the trailer assembly with regard to the bed assembly, the optional features of wheel assembly and the draw bar does not address the requirement of a portable trailer assembly for meeting the space constraints and easy transportability.

The features of the aforecited prior art disclose a complex design and structural indices that hinder their performance in meeting the above-mentioned requirements. The prior arts does not provide a configuration that has simple structural indices for reliable operation i.e. can be easily assembled and de-assembled, can be easily folded and is portable enough to be carried and stored in a small space, multi-functional, retrofittable at the same time light weight and affordable too. Therefore, the present scenario is punctuated by an emerging need for a multipurpose, portable and adjustable trailer assembly that addresses these issues with effectiveness, ease and comfort.

SUMMARY OF THE INVENTION

In view of the foregoing disadvantages inherent in the above-mentioned prior arts, the general purpose of the present invention is to provide an improved combination of convenience and utility, to include all the advantages of the prior arts, and to overcome the abovementioned disadvantages/drawbacks of the prior art.

It is therefore, a principal aspect of the present invention to provide a portable and adjustable trailer assembly that allows for easy assembling and de-assembling, foldability, portable enough to be carried and stored in a small space, multi-functional utility, retrofittable to various vehicles and at the same time light weight and affordable.

It is yet another aspect of the present invention to provide a portable and adjustable trailer assembly which comprises a frame portion and a platform portion releaseably lockable with each other and configuring a frame assembly thereof, a wheel assembly mechanically coupled to the platform portion at its underneath and a detachable and lockable draw bar assembly coupled to the frame assembly and having means to connect to a tow vehicle. The portable and adjustable trailer assembly is configured to be folded into the frame assembly and enables easy storage and transportation.

In yet another aspect the present invention provides for a portable and adjustable trailer assembly comprises a frame assembly having a frame portion with front and rear ends, pivotally and hingedly coupled at its rear end to a first end of a platform portion, the second end of the platform portion coupled to a rear beam, the portions being releaseably locked with each other and folds out to configure a lateral plane when in operation, a wheel assembly mechanically coupled to the platform portion at its underneath; and a detachable and lockable draw bar assembly having first and second ends, mechanically coupled to the frame assembly at the first end having means to connect to a tow vehicle at the second end.

In yet another aspect the present invention provides for a portable and adjustable trailer assembly wherein the means for coupling the detachable and lockable draw bar assembly to the frame assembly may include a box channel underneath the frame assembly, the channel extending completely underneath the frame portion and partially underneath the platform portion. The box channel further has means for coupling the detachable and lockable draw bar assembly to the frame assembly.

In yet another aspect the present invention provides for a method of operating a portable and adjustable trailer assembly having a frame assembly configuring a frame and platform portions with a box channel extending underneath therethrough, a wheel assembly with a pair of wheels, a detachable and lockable draw bar assembly with a draw bar and a chain having a pin, the method comprises keeping the portable and adjustable trailer assembly in an upright position, placing the platform portion on the ground and pushing a handle to outside of the frame portion, pushing a locking mechanism on each side of the frame portion enabling the frame portion to open up about ninety (90°) degrees on hinges connected to the platform portion, pulling completely slide bolts with pins on each side of the wheel assembly, pulling up one wheel and pushing the pin back in, repeating the same for the second wheel, configuring a draw bar with a welded bar, holding the draw bar upside down and pushing it into the box channel underneath the frame assembly until it gets locked in the box channel, configuring a two finger clamp on the frame portion and pushing the welded bar in the box channel until the welded bar fits into the two finger clamp, configuring a guide hole in the center of the box channel and inserting the chain pin into the guide hole and locking the same, picking up the portable and adjustable trailer assembly with the draw bar on the rear and tilting the assembly until the wheels touch the ground and coupling the portable and adjustable trailer assembly to a tow vehicle for transportation.

These together with other aspects of the present invention, along with the various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there are illustrated exemplary embodiments of the invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 7a is a bottom perspective view of the portable and adjustable trailer assembly 10 depicting installation of a coupler/draw bar assembly 12 and an automobile drawbar assembly 70, according to a preferred embodiment of the present invention;

FIG. 7b is a bottom perspective view of the portable and adjustable trailer assembly 10 depicting a deployed and assembled state, according to a preferred embodiment of the present invention;

FIG. 8a is a perspective view of the portable and adjustable trailer assembly 10 depicting a protective covering portion 80, according to a preferred embodiment of the present invention;

FIG. 8b is a top perspective view of a storage sack portion 83 of the portable and adjustable trailer assembly 10, according to a preferred embodiment of the present invention;

DESCRIPTIVE KEY

Figure 1:
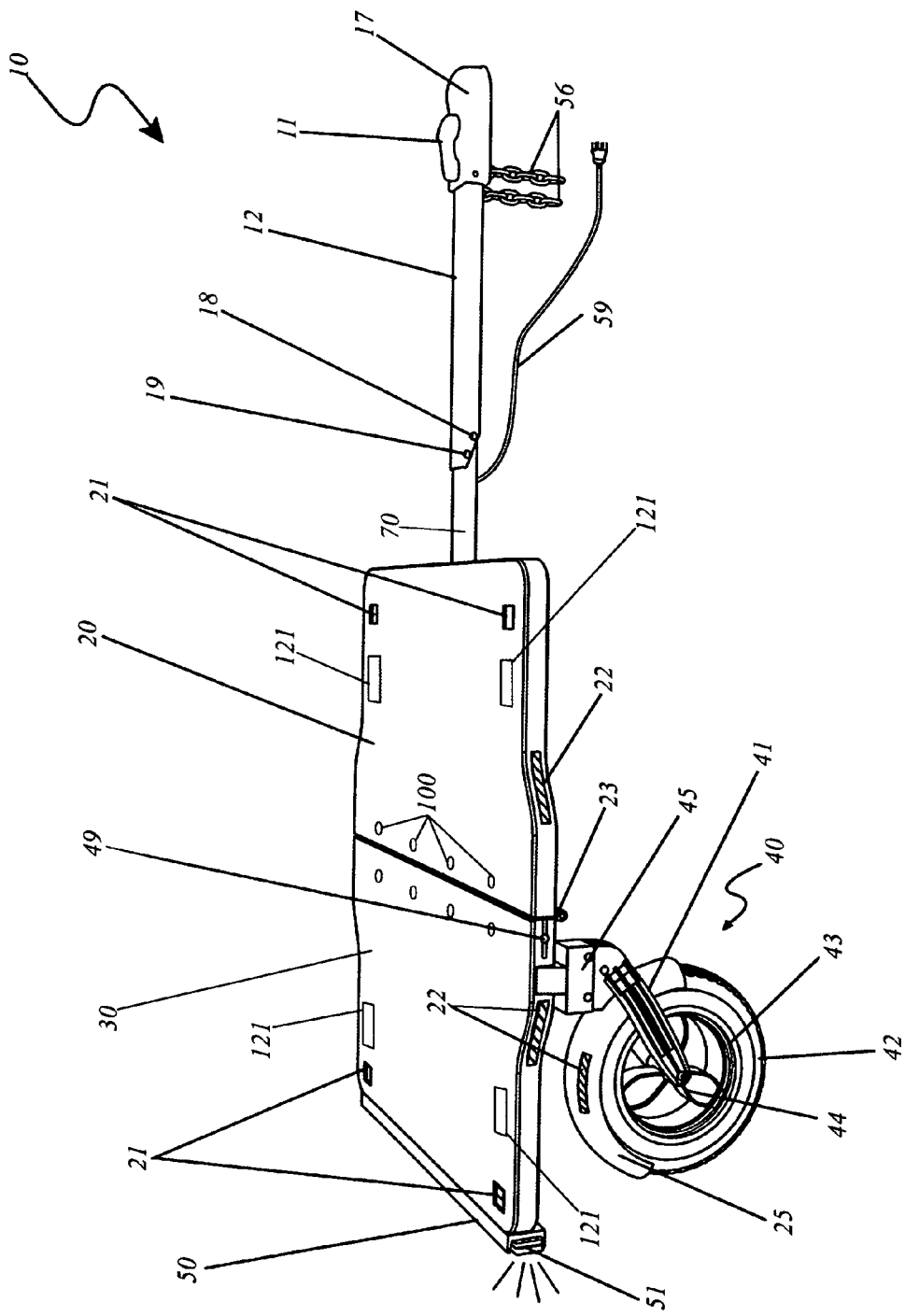
FIG. 1 is a side perspective view of a portable and adjustable trailer assembly 10, according to a preferred embodiment of the present invention.

| | |
|---|---|
| 10 | portable and adjustable trailer assembly |
| 11 | coupler locking handle |
| 12 | coupler/draw bar assembly |
| 16 | handle |
| 17 | 1⅛ inch ball-coupler |
| 18 | first pivot |
| 19 | first locking mechanism |
| 20 | front platform |
| 21 | stake pole apertures |
| 22 | reflective tape |
| 23 | second pivot |
| 25 | fender |
| 26 | bumper |
| 30 | rear platform |

-continued

| | |
|---|---|
| 40 | wheel/suspension assembly |
| 41 | suspension arm |
| 42 | tire |
| 43 | wheel |
| 44 | propeller spoke |
| 45 | suspension housing |
| 46 | suspension member |
| 47 | third pivot |
| 48 | suspension member anchor |
| 49 | second locking mechanism |
| 50 | rear beam |
| 51 | tail light |
| 52 | license plate light assembly |
| 53 | license plate holder |
| 54 | wing nut |
| 55 | license plate light |
| 56 | safety chain |
| 57 | female electrical receptacle |
| 58 | male electrical receptacle |
| 59 | vehicle electrical cable |
| 60 | front platform stiffener |
| 61 | drawbar receiver |
| 62 | drawbar latch aperture |
| 63 | drawbar latch |
| 64 | drawbar latch bracket |
| 65 | drawbar latch locking pin |
| 66 | drawbar latching handle |
| 67 | drawbar mounting bracket |
| 68 | rear platform stiffener |
| 70 | automobile drawbar assembly |
| 71 | motorcycle drawbar assembly |
| 72 | garden-cart drawbar assembly |
| 73 | garden-cart dolly |
| 74 | garden-cart wheel |
| 75 | bicycle carrier |
| 76 | vertical plate |
| 77 | horizontal plate |
| 78 | bicycle attachment mechanism |
| 80 | protective cover assembly |
| 81 | enclosure |
| 82 | enclosure strap |
| 83 | storage sack |
| 84 | draw string |
| 85 | tubular frame |
| 86 | motorcycle embodiment |
| 87 | garden-cart embodiment |
| 88 | bicycle carrier embodiment |
| 89 | snow/ski embodiment |
| 90 | ski |
| 91 | ski bracket |
| 92 | ski hoop |
| 93 | hard wagon sides |
| 94 | wagon slats |
| 95 | wagon stake pole |
| 96 | wagon pull handle |
| 97 | tailgate |
| 100 | attachment/fastener |
| 110 | vehicle |
| 120 | bicycle |
| 121 | slot |
| 122 | locking bolt aperture |
| 123 | drawbar bracket latch |
| 124 | platform clip |
| 125 | locking bar |
| 126 | locking bolt |
| 127 | locking receiver |
| 128 | locking groove |
| 129 | ski strap |
| 130 | license plate |

DETAILED DESCRIPTION OF THE PREFERRED EMBODIMENT

The best mode for carrying out the invention is presented in terms of its preferred embodiment, herein depicted within FIGS. 1 through 8*b*, 13*a* and 13*b*, and alternate embodiments as depicted in FIGS. 9 through 12. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a device and method for a portable and adjustable trailer assembly (herein described as the "apparatus") 10, which provides a means for a foldable two-section trailer platform and a removable drawbar assembly 12 providing a means to attach to a conventional ball hitch assembly 17. While the apparatus 10 is in a folded state, a handle 16 is provided allowing easy transportation. The apparatus 10 further comprises an elastic link suspension 40, a canopy cover assembly 80, and typical trailer features such as lighting 51, safety chains 56, and a removable license plate bracket 53. Additional embodiments of the present invention 10 include hard wagon-like sides 93 and multiple use drawbar assemblies 71, 72; however, it is understood that the apparatus 10 is not limited to the depicted embodiments and may be used to transport any number of cargo and equipment items such as small boats, jet skis, motorcycles, and the like providing benefit to a user.

Referring now to FIG. 1, a side perspective view of the apparatus 10, according to the preferred embodiment of the present invention, is disclosed. The apparatus 10 comprises an automobile drawbar 70, a first pivot 18, a first locking mechanism 19, a front platform 20, a rear platform 30, a pair of second pivots 23, reflective tape 22, four (4) stake pole apertures 21, and four (4) slots 121.

The apparatus 10 is envisioned being made using light-weight cast, extruded, and sheet materials such as aluminum or carbon fiber and utilizing a plurality of attachment/fasteners 100 such as rivets, welding, screws, bolts, and the like forming a rugged assembly capable of withstanding anticipated stress and vibration resulting from high-speed travel over highway and/or rough surfaces during use.

The automobile drawbar 70 provides a two-piece hinging assembly comprising a first pivot 18 and a first locking mechanism 19 at an intermediate location. The automobile drawbar 70, when folded, provides a compact storage means as well as providing a tilting means to aid loading/unloading of the apparatus 10 (see FIG. 3). The automobile drawbar 70 further comprises additional features common to trailer hitches such as a 1⅞ inch ball-coupler 17, safety chains 56, and a coupler locking handle 11.

The front 20 and rear 30 platforms provide a hinged attachment to one another via a pair of second pivots 23 forming a continuous platform being approximately four (4) feet wide and approximately five (5) feet in length. Said platforms 20, 30 are envisioned being made using light-weight rugged aluminum alloy plate comprising a stiffening and strengthening rectangular edge detail projecting downward approximately two (2) to three (3) inches all around made using like materials incorporating fabrication processes such as casting, welding, and/or bending processes. A plurality of attachment/fasteners 100 provide a strong connecting means therebetween elements of the front 20 and rear 30 platforms using rivets, bolts, welding, or equivalent methods. The reflective tape 22 provides sufficient night-time visibility to the apparatus 10 being affixed thereupon said platforms 20, 30 using various adhesives and being located upon a plurality of outer vertical side surfaces in conformance with federal, state, and local transportation regulations.

Figure 10:
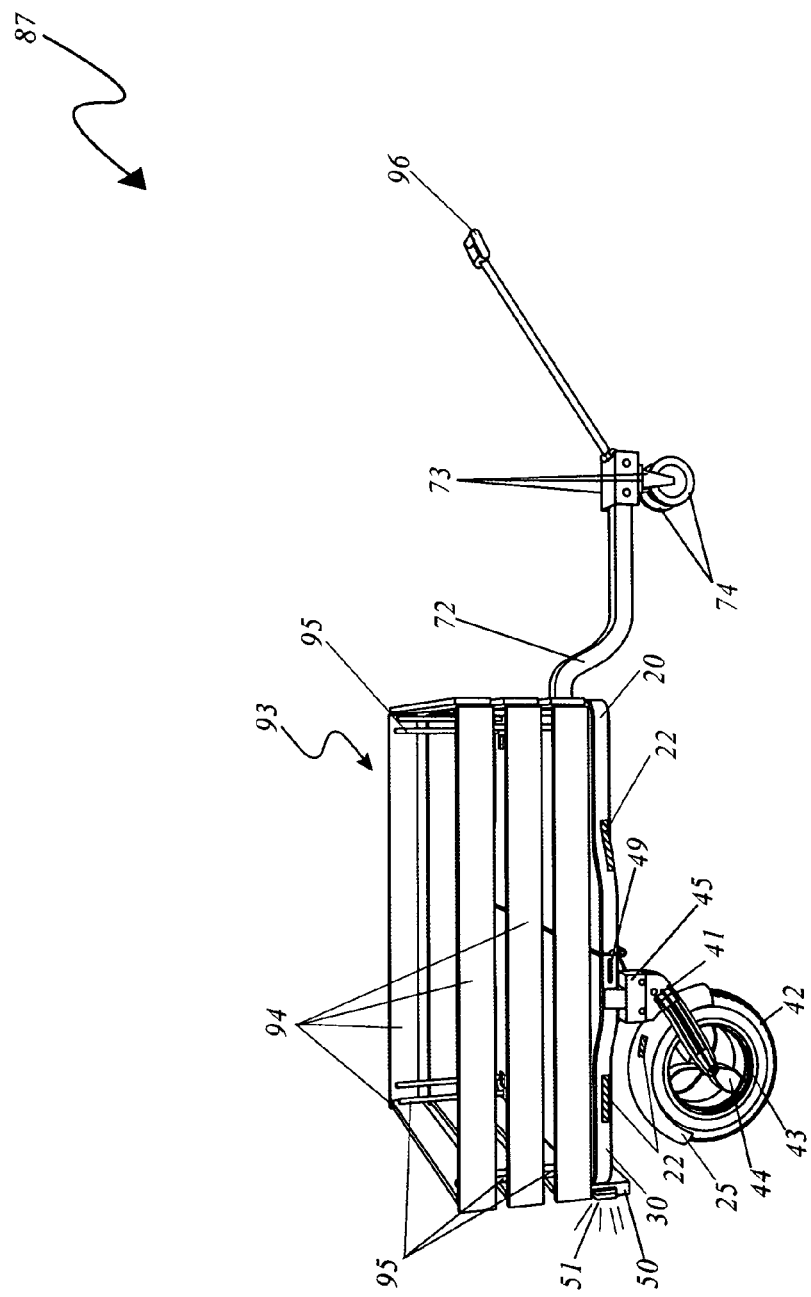
FIG. 10 is a side perspective view of a garden cart embodiment 87 depicting a garden-cart drawbar 72 and hard wagon sides 93, according to an alternate embodiment of the present invention.

Located adjacent to four (4) top corners of the assembled platforms 20, are four (4) integral stake pole apertures 21 comprising rectangular vertical openings approximately one (1) to two (2) inches square which are particularly sized to receive a stake pole 95 therein (see FIG. 10). Each stake pole aperture 21 further comprises a section of square aluminum alloy tubing approximately three (3) inches long being welded in a vertical orientation thereto a bottom surface of said platforms 20, 30 along an outer edge thereof (see FIG. 6). Adjacent thereto the stake pole apertures 21 are four (4) slots 121 machined or formed therethrough said platforms 20, 30 being approximately four (4) inches long and one-half (½) inch wide being parallel thereto outer side edges of said platforms 20, 30. The slots 121 provide an attachment means thereto cargo, equipment, and a protective cover assembly 80 (see FIGS. 8a through 8c).

Figure 2:
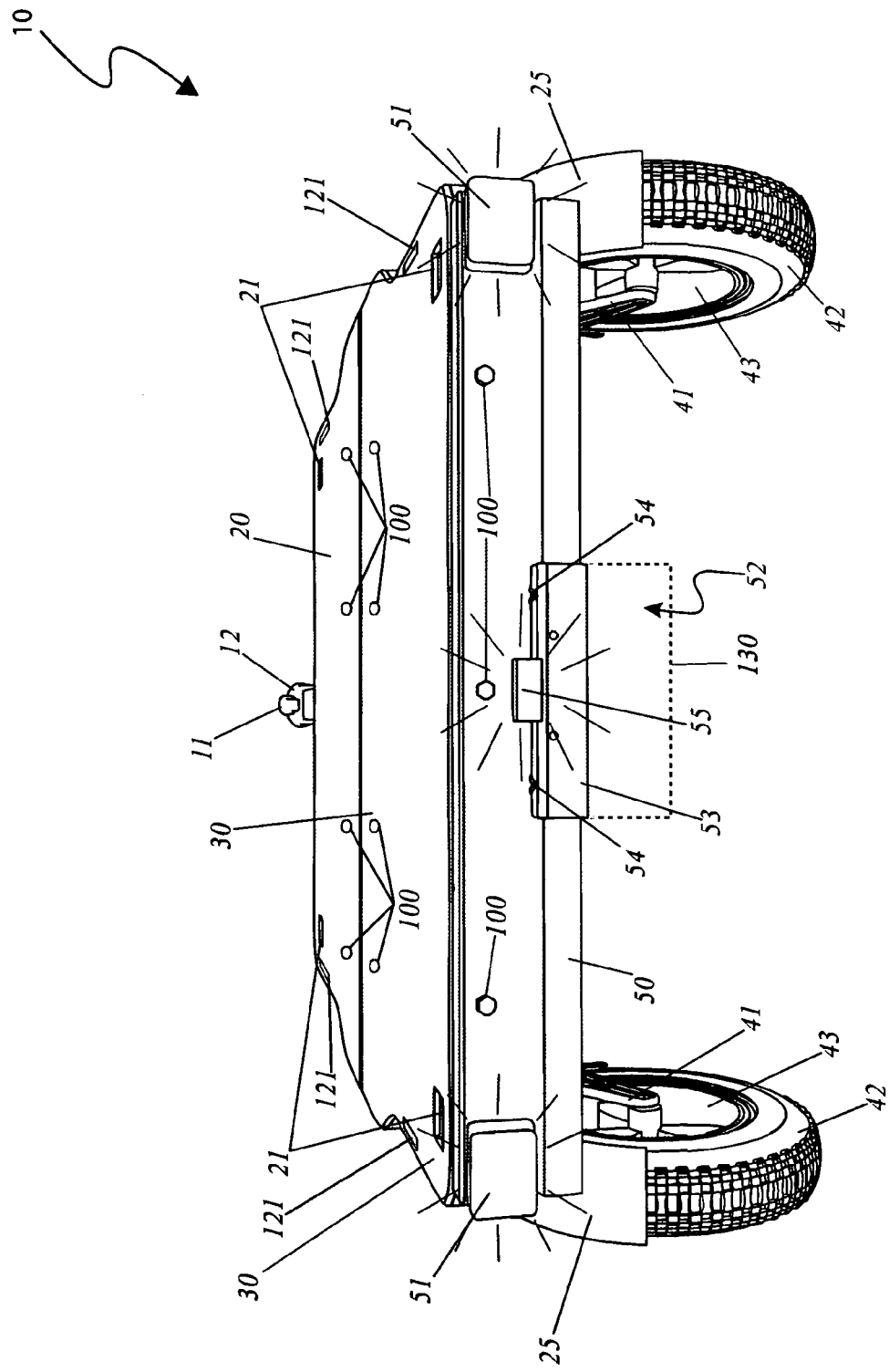
FIG. 2 is a rear perspective view of the portable and adjustable trailer assembly 10, according to a preferred embodiment of the present invention.

Referring now to FIG. 2, a rear perspective view of the apparatus 10, according to the preferred embodiment of the present invention, is disclosed. The apparatus 10 comprises a rear platform 30, a rear beam 50, a pair of taillights 51, a plurality of attachment/fasteners 100, and a license plate light assembly 52.

The rear platform 30 provides an attachment means along a rear vertical surface to the rear beam 50 via a plurality of corrosion-resistant attachment/fasteners 100 such as nuts, bolts, and the like. Said rear beam 50 comprises a channel-shaped aluminum alloy member positioned in a vertical orientation being approximately six (6) inches high being similar to a common trailer bumper. The channel-shaped feature of the rear beam 50 provides a protective mounting means to a pair of tail lights 51 being located therein a recessed portion at opposing ends of said rear beam 50. The tail lights 51 are envisioned to be commercially available weather-proof sealed devices providing standard illumination functions such as turning, reverse, and parking indicators in accordance with federal, state, and local transportation regulations. The license plate holder assembly 52 comprises a removably attachable "L"-shaped aluminum alloy assembly affixed thereto a lower inside edge of said rear beam 50, thereby providing fast and easy installation or disassembly. The license plate holder assembly 52 comprises a pair of formed horizontal surfaces at each side thereupon for attachment to said rear beam using corrosion-resistant attachment/fasteners 100 such as bolts, wing nuts, and the like. The license plate holder assembly 52 further comprises a vertical license plate holder 53 suitable to mount a standard license plate 130 and license plate light 55. The license plate light 55 is located at an upper intermediate position and envisioned to comprise a common automotive illuminating device providing expected wiring and connectors and being similar to those used on various utility trailers, automobiles, and the like.

Figure 3:
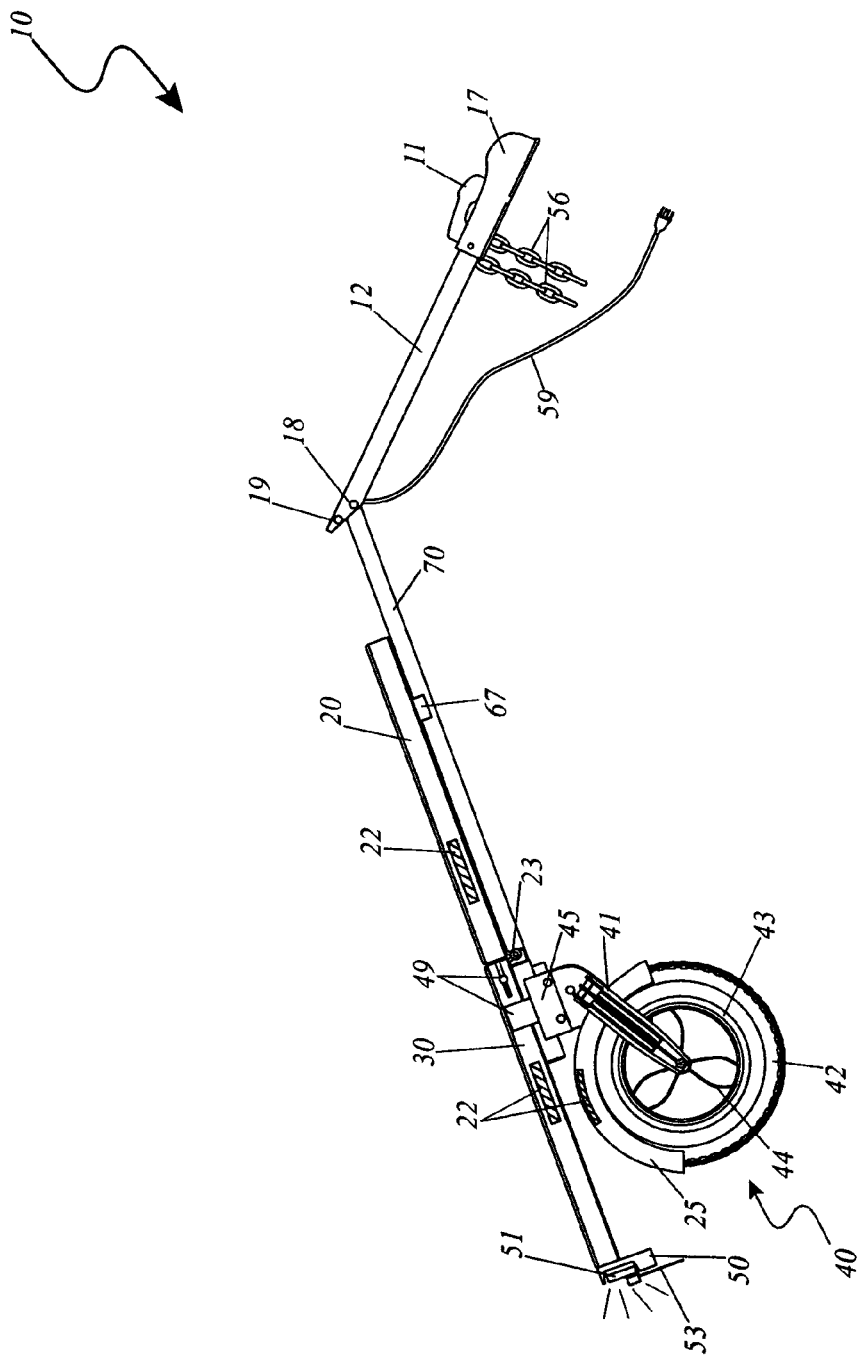
FIG. 3 is a side perspective view of the portable and adjustable trailer assembly 10 depicting a tilted state, according to a preferred embodiment of the present invention.

Referring now to FIG. 3, a side perspective view of the apparatus 10 depicting a tilted state, according to the preferred embodiment of the present invention, is disclosed. The apparatus 10 comprises a coupler/drawbar assembly 12, an automobile drawbar assembly 70, a first pivot 18, a first locking mechanism 19, and a vehicle electrical cable 59. The first pivot 18 provides a tilting means to the apparatus 10 when attached thereto an automobile 110 providing easy loading and unloading of various equipment, wheeled vehicles, and the like. The first pivot 18 comprises a fixed axial connecting member therebetween the coupler/drawbar assembly 12 and the automobile drawbar 70. Adjacent to said first pivot 18 is a first locking mechanism 19 comprising a second connecting member via a detachable pin device such as a quick-release pin, bolt/nut, or other type of secure attachment/fasteners 100. Once removed, the first locking mechanism 19 provides an angular tilting connection thereabout the first pivot 18. The automobile drawbar 70 comprises a rugged rectangular tubing member made preferably using steel or aluminum alloys. The vehicle electrical cable 59 is routed therein the automobile drawbar 70 and exiting adjacent to the first pivot 18 at an open end portion of said automotive drawbar 70. The vehicle electrical cable 59 provides a termination comprising a standard multi-prong connector with ground. The vehicle electrical cable 59 further comprises bundled copper conductors providing communication of a 12-volt electrical current to the aforementioned tail lights 51 and license plate lights 55 via common insulated copper conductors.

Figure 4:
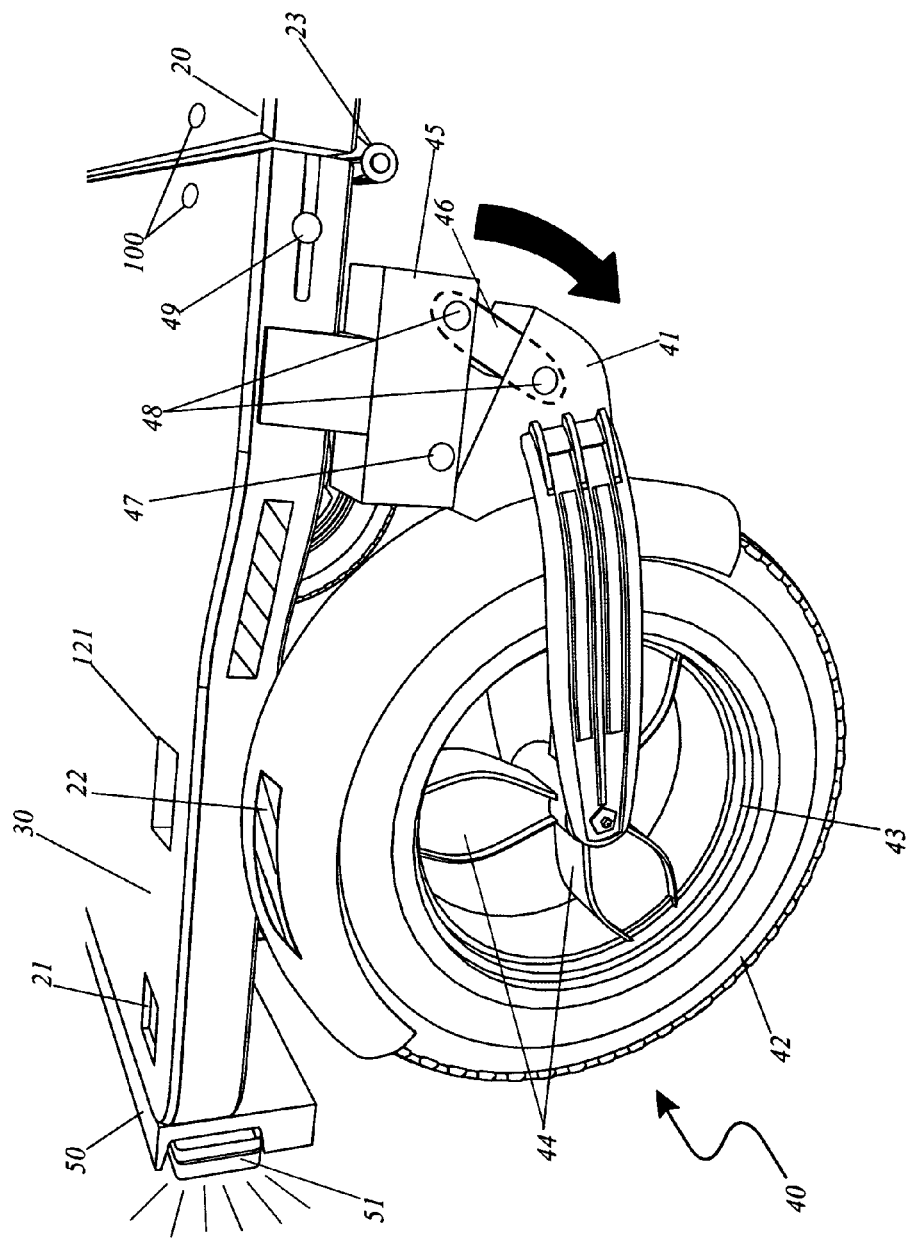
FIG. 4 is a close-up view of a wheel/suspension assembly portion 40 of the portable and adjustable trailer assembly 10, according to a preferred embodiment of the present invention.

Referring now to FIG. 4, a close-up view of a wheel/suspension assembly portion 40 of the apparatus 10, according to the preferred embodiment of the present invention, is disclosed. The wheel/suspension assembly 40 comprises a suspension housing 45, a second locking mechanism 49, a suspension member 46, a pair of suspension member anchors 48, a third pivot 47, a suspension arm 41, a fender 25, a wheel 43, a plurality of propeller spokes 44, and a tire 42. The wheel/suspension assembly 40 comprises a foldable deployable wheel assembly providing an adjustable resistance suspension system customizable to a variety of loading scenarios. The suspension housing 45 comprises a sturdy open-bottomed metal enclosure providing a mounting means to the second locking mechanism 49. The second locking mechanism 49 provides a manual attachment means between the suspension housing 45 and the rear platform 30 providing a hinging and locking axial connection along an outer portion of the rear platform 30 (see FIGS. 13a and 13b). Also located at a lower rear position upon said suspension housing 45 is the third pivot 47. The third pivot 47 comprises a fixed axial pin device providing a rotating attachment means to the suspension arm 41 thereupon. The suspension arm 41 comprises a rugged fork-shaped load-bearing member designed to straddle the wheel assembly 43 and terminating at an axle connection thereupon. The suspension arm 41 is depicted as an aluminum alloy casting comprising integrally-molded strengthening ribs common in the industry. As the suspension arm 41 moves in an angular manner with respect to the suspension housing 45, pivoting about the third pivot 47, a flexible suspension member 46 provides a load bearing and suspension control means being in an increasing tensile condition as a load is applied to the apparatus 10. The flexible suspension member 46 comprises a rugged oval-shaped rubber link-type device similar to like devices used in exercise equipment. Said flexible suspension member 46 is secured to both the suspension housing 45 and the suspension arm 41 via a pair of suspension member anchors 48. The suspension member anchors 48 comprise removably attachable axial devices inserted therethrough female features of said suspension members 46. The suspension member anchors 48 are envisioned to be of sufficient length being capable of securing one (1) or more suspension members 46 thereupon, thereby enabling customization of the wheel/suspension assembly 40 to particular loading scenarios.

The suspension arm 41 further provides an attachment means to an attachable fender 25 providing protection of the apparatus 10 and cargo from dirt or debris during travel in an expected manner. The suspension arm 41 projects generally downward and further provides an attachment means to a wheel 43 and tire 42 assembly via expected features such as a spindle/axle, spindle/axle hardware, high-speed inner and outer sealed bearings, dust caps, castellated nuts, and cotter pins common in the industry. The wheel 43 is envisioned to be made using light-weight aluminum alloys and further comprising a plurality of propeller-shaped spokes 44 which provide an air displacement means moving air in an outward direction from the apparatus 10 when in motion, thereby providing additional cooling to the wheels 43 and tires 42. Additionally, said outward air flow creates a partial vacuum, thereby causing a downward force upon the apparatus 10. Said down force is envisioned to be similar to that of race cars which adds stability thereto the apparatus 10 during transport. The tires 43 comprise a pair of common high-speed small diameter multi-ply pneumatic tires 42.

Figure 5:
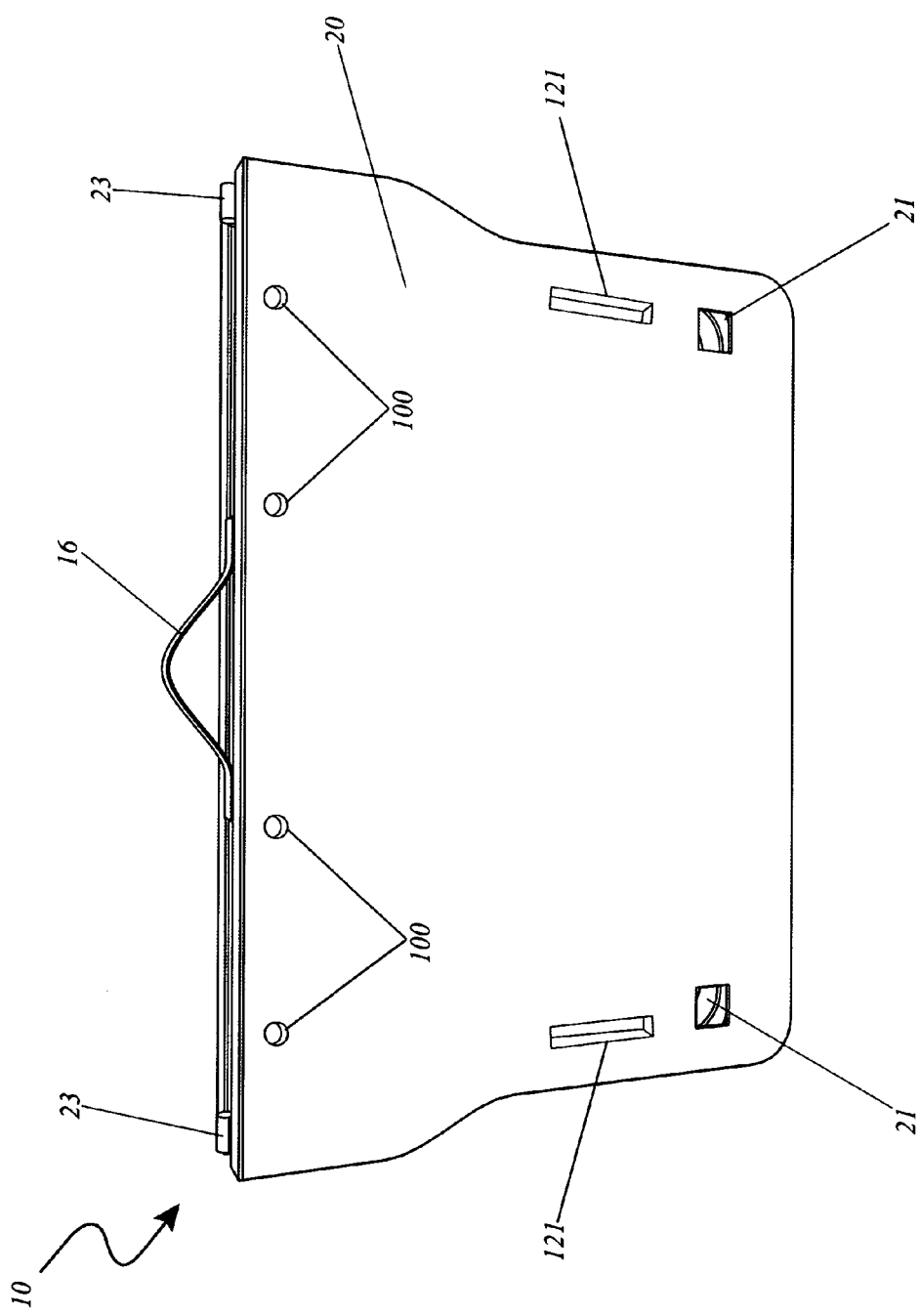
FIG. 5 is a front perspective view of the portable and adjustable trailer assembly 10 depicting a collapsed and portable state, according to a preferred embodiment of the present invention.

Referring now to FIG. 5, a front perspective view of the portable and adjustable trailer assembly 10 depicting a collapsed and portable state, according to the preferred embodiment of the present invention, is disclosed. The apparatus 10 is illustrated here being pivotally collapsed via rotation about a pair of second pivots 23. The apparatus 10 comprises a pair of internal platform clips 124 to hold the platforms 20, 30 in intimate contact thereto one another (see FIG. 6). The apparatus 10 further comprises a heavy-duty textile handle 16. The handle 16 provides a manual carrying means to the apparatus 10 when in the stored state enabling portability and convenient storage in an automobile trunk, a closet, or the like. The handle 16 comprises an attachment means to the front 20 and rear 30 platforms upon a bottom surface and being made using plastic or textile materials of a flexible nature so as to be displaced inwardly during assembly of the apparatus 10, thereby allowing intimate contact of said platforms 20, 30 (see FIG. 6).

Figure 6:
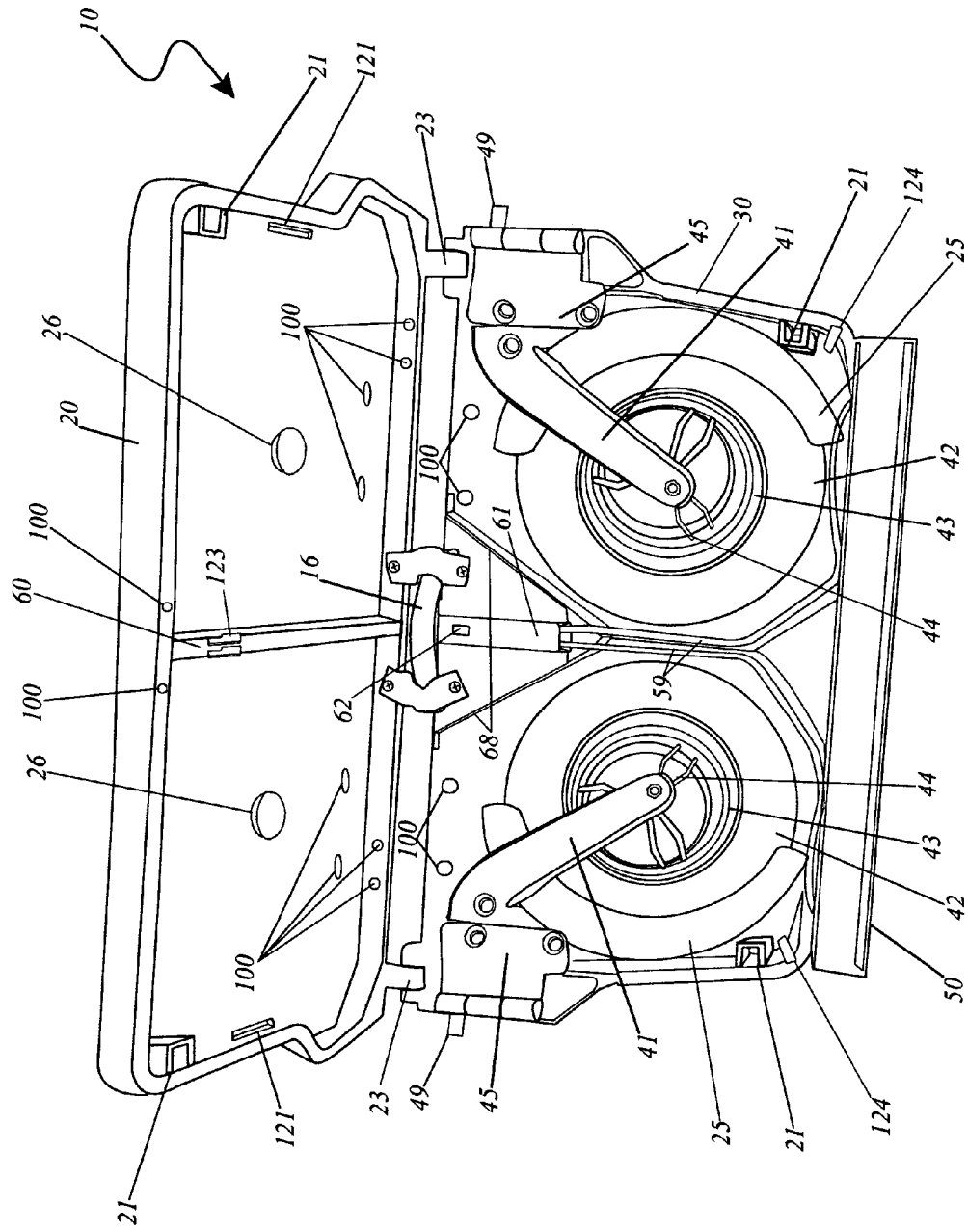
FIG. 6 is a bottom perspective view of the portable and adjustable trailer assembly 10 depicting a stored state, according to a preferred embodiment of the present invention.
Figure 7D:
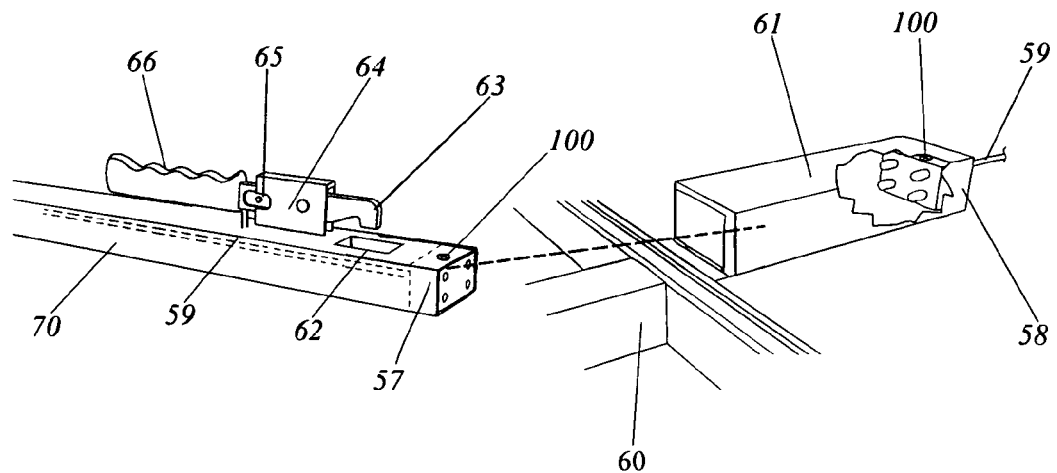
FIG. 7d is a close-up view of the portable and adjustable trailer assembly 10 depicting a drawbar receiver 61 and an automobile drawbar assembly 70 in a detached state, according to a preferred embodiment of the present invention.
Figure 7C:
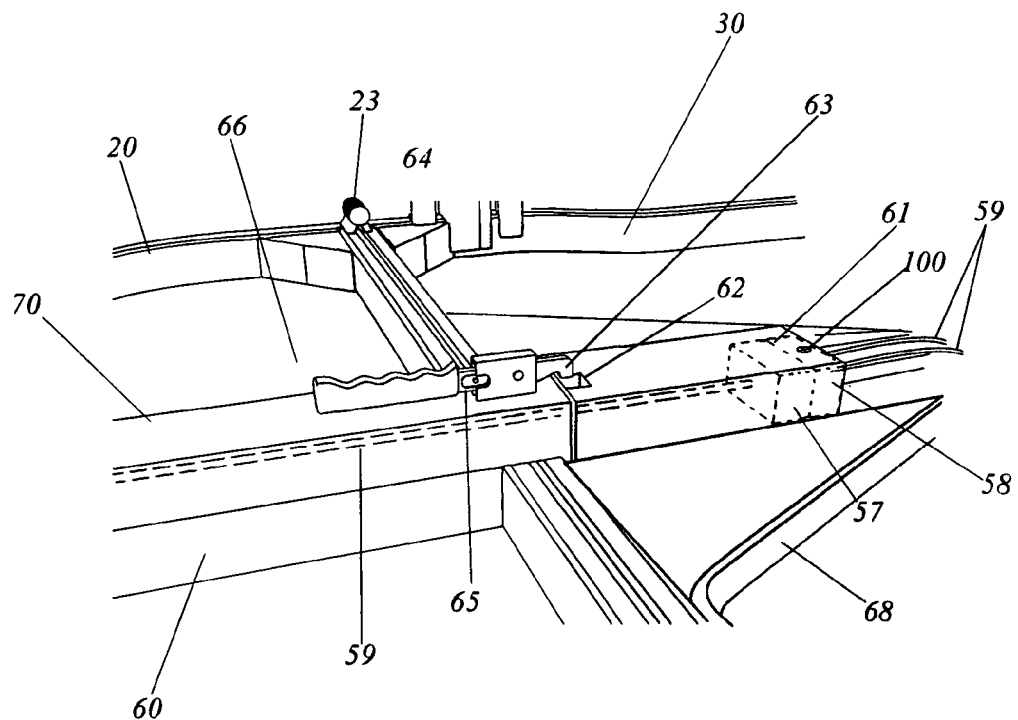
FIG. 7c is a close-up view of the portable and adjustable trailer assembly 10 depicting a drawbar receiver 61 and an automobile drawbar assembly 70 in an assembled state, according to a preferred embodiment of the present invention.

Referring now to FIG. 6, a bottom perspective view of the apparatus 10 depicting a stored state, according to the preferred embodiment of the present invention, is disclosed. The apparatus 10 as illustrated here shows the wheel/suspension assemblies 40 in their folded state being rotated fully and resting against the rear platform 30. Also shown is the attachment portion of the aforementioned handle 16 thereon the front 20 and rear 30 platforms. Additionally, the front platform 20 is illustrated being rotated about the pair of second pivots 23 to approximately a 90 degree angle with respect to the rear platform 30. The apparatus 10 also comprises a pair of rubber bumpers 26 and a plurality of attachment/fasteners 100. The rubber bumpers 26 are affixed along an inner surface of the front platform 20 being coincidental to the center of each wheel 43 providing protection thereto said front platform 20 from protruding features thereupon the wheel/suspension assemblies 40. A plurality of attachment/fasteners 100 located along a common lower edge of the platforms 20, 30 provide a strong coplanar assembly of said platforms 20, 30. The rear platform 30 further comprises a rear platform stiffener 68 which provides lower support thereto said rear platform 30 along a longitudinal centerline thereof. The rear platform stiffener 68 comprises two (2) parallel metal flat stock elements approximately one (1) to two (2) inches high and approximately one-quarter (¼) inch thick. The parallel elements of the rear platform stiffener 68 are divergent at forward and trailing ends thereof and are affixed using common attachment/fasteners 100 thereto said rear platform 30 along the rear beam 50 and along a forward edge thereof. The rear platform stiffener 68 also provide a wire anchoring means thereto vehicle electrical cables 59 routed therebetween a drawbar receiver 61 and the two (2) tail light assemblies 51 (see FIGS. 7a through 7d). Said vehicle electrical cables 59 are envisioned being secured thereto the rear platform stiffener 68 using standard wire dressing devices such as tie-wraps, wire clips, or the like.

The rear platform 30 further provides an attachment means thereto a pair of platform clips 124. The platform clips 124 provide a clasping means securing the front platform 20 thereto the rear platform 30 forming a compact configuration thereto the apparatus 10 when in the folded and stored state, thereby aiding manual transportation of the apparatus 10. The platform clips 124 are affixed thereto rear inside corners of the rear platform 30 using common attachment/fasteners 100. The platform clips 124 comprise a pair of finger-shaped appendages having particular contoured features so as to securely latch thereto a corresponding edge profile of the front platform 20.

Referring now to FIGS. 7a through 7d, various perspective views of the apparatus 10 depicting deployment and installation of a coupler/drawbar assembly 12 and an automobile drawbar assembly 70, according to the preferred embodiment of the present invention, are disclosed. The apparatus 10 comprises a coupler/drawbar assembly 12, an automobile drawbar assembly 70, a front platform stiffener 60, and a drawbar receiver 61.

The coupler/drawbar assembly 12 further comprises a sturdy structural member made using rectangular or channel shapes being approximately two (2) inches square providing an attachment means to a 1⅞ inch ball-coupler 17, a coupler locking handle 11, and safety chains 56. The 1⅞ inch ball-coupler 17 is envisioned to be a standard ball coupler commonly used on light-duty utility trailers comprising expected features such as a locking handle 11, a ball hitch captivating device, a lever type handle, a locking safety pin, a security chain, and safety chains 56. The coupler/drawbar assembly 12 also provides an attachment means to the automobile drawbar assembly 70 via a first pivot 18 and a first locking mechanism 19 as previously described (see FIG. 3).

The automobile drawbar assembly 70 further comprises a sturdy rectangular structural member similar to the aforementioned coupler/drawbar assembly 12. The automobile drawbar assembly 70 provides a strong attachment to the front 20 and rear 30 platforms along a lower surface via an engaging and latching means. The automobile drawbar assembly 70 comprises a pair of drawbar mounting brackets 67, a drawbar pin 122, a drawbar latch 63, a drawbar latch bracket 64, a drawbar latch locking pin 65, a drawbar latching handle 66, and an internal multi-pin female electrical receptacle 57. The front platform stiffener 60 comprises a sturdy aluminum tubular member providing structural rigidity to the front platform 20 along a longitudinal centerline. The front platform stiffener 60 is attached at an intermediate lateral position along a lower surface of the front platform 20 spanning from a forward edge to a rear edge thereupon. The front platform stiffener 60 is envisioned to be attached to the front platform 20 using attachment/fasteners 100, welding processes, or the like.

The drawbar receiver 61 comprises a stationary horizontal tubular member affixed thereto the rear platform 30 adjacent thereto the platform stiffener portion 68 along a lower surface thereof. The drawbar receiver 61 further comprises an internal multi-pin male electrical receptacle 58. The automobile drawbar assembly 70 provides a slidingly engaging means thereinto a drawbar receiver 61 during an assembly process. The drawbar receiver 61 comprises an inner space particularly sized to receive said automobile drawbar assembly 70 therewithin. During insertion of the automobile drawbar assembly 70 thereinto the drawbar receiver 61, coincidental engagement occurs between the drawbar mounting bracket portions 67 horizontal drawbar pin portions 122 of the automobile drawbar assembly 70 and corresponding hook-shaped drawbar bracket pin latch portions 123 affixed thereto the front platform stiffener 60. Also in coincidental engagement are the female receptacle portion 57 of the drawbar assembly 70 and the male receptacle portion 58 of the drawbar receiver 61 providing an electrical connection means. Said receptacles 57, 58 provide an intermediate detachable connection thereof a plurality of vehicle electrical cables 59 routed thereto the tail lights 51 and license plate lights 55. Said male 57 and female 58 receptacles comprise rectangular molded plastic electrical connectors specifically sized to fit snugly therewithin the rectangular drawbar assembly 70 and drawbar receiver 61, respectively, being affixed thereto using common attachment/fasteners 100. Said receptacles 57, 58 are envisioned to provide a plurality of conductors including a ground wire in an expected manner. The drawbar latch 63 and the drawbar latch aperture 62 are located along an upper surface of the drawbar receiver 61 and provide secured attachment of the automobile drawbar assembly 70 thereto the drawbar receiver 61. The drawbar latch 63 comprises a linear member with a hook-shaped latching device made using metal flat stock. The drawbar latch 63 provides a pivoting axial attachment at an intermediate location to the automobile drawbar assembly 70 via a drawbar latch bracket 64 which further provides an integral spring-loaded drawbar latch locking pin 65 and corresponding slot therein said drawbar latch bracket 64 providing a securing means holding said drawbar latch 63 in an inserted and locked position within the drawbar latch aperture 62. A form-fitting drawbar latching handle 66 provides a grasping and gripping means to aid in manual operation of the drawbar latch 63 and is envisioned to being made using a soft rubber or plastic material and providing finger relief features.

The drawbar mounting brackets 67 comprise a pair of "L"-shaped brackets providing attachment of the automobile drawbar assembly 70 thereto the drawbar bracket latches 123 located along the front platform stiffener 60. The drawbar mounting brackets 67 comprise opposing welded fixtures being perpendicular to the main axis of the automobile drawbar assembly 70 and in direct contact with a forward edge of the front platform 20 being affixed thereto using attachment/fasteners 100.

Figure 8C:
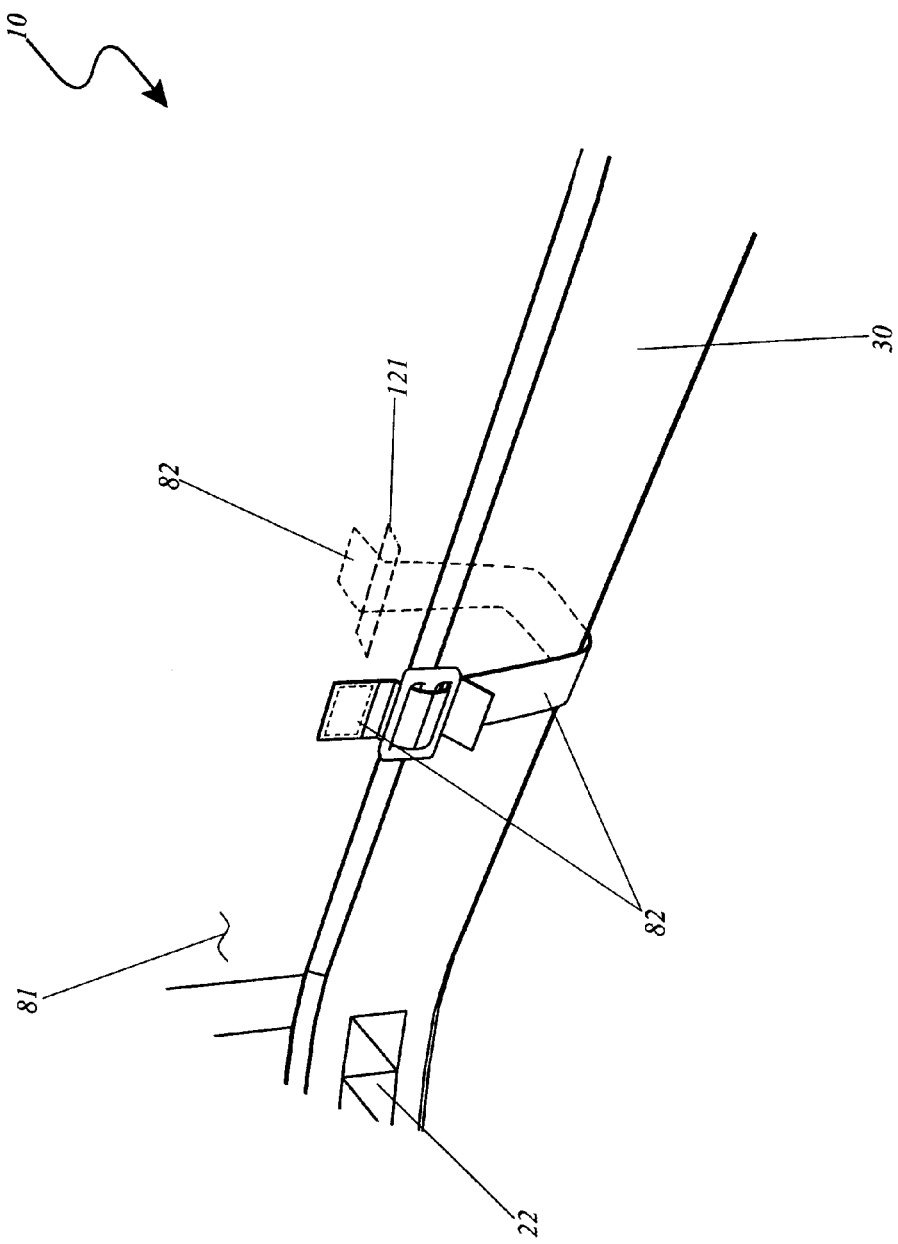
FIG. 8c is a close-up view of an enclosure strap portion 82 of the protective covering 80, according to a preferred embodiment of the present invention.

Referring now to FIGS. 8a through 8c, perspective views of the portable and adjustable trailer assembly 10 depicting a protective covering 80 and storage sack portion 83, according to the preferred embodiment of the present invention, are disclosed. The protective covering 80 provides a water-proof protection means to equipment and cargo being transported using the apparatus 10. The protective covering 80 further comprises a tubular internal frame 85, an enclosure 81, four (4) enclosure straps 82, and a storage sack 83. The tubular frame 85 defines a box-shaped form generally corresponding to an outline of the platforms 20, 30 and being approximately three (3) to four (4) feet high. The tubular frame 85 is envisioned to be made using rigid light-weight aluminum tubing approximately one (1) inch in diameter utilizing a common tube and socket type construction and may be provided with various attachment devices such as bolts, quick-release pins, ball/detent fasteners, or the like. The enclosure 81 provides a six-sided weather-proof barrier around the tubular frame 85 and included cargo. The enclosure 81 is envisioned to provide further protection via a floor portion, an integral weather-resistant zipper along an intermediate perimeter thereon, and a protective flap covering said zipper. The enclosure 81 provides attachment thereto the platforms 20, 30 via the sewn-in enclosure straps 82 routed therethrough the slots 121 and located along side surfaces of the enclosure 81 at front and rear positions thereon. Each enclosure strap 82 comprises a pair of rugged latching textile straps affixed and sewn thereto the protective cover assembly 80 along adjacent external floor and outer face surfaces and attached thereto one another using common strapping fixtures such as a latching and length adjusting buckle. The enclosure straps 82 are specifically positioned in alignment thereto the four (4) aforementioned slots 121 located along a top surface of the front 20 and rear 30 platforms. The enclosure 81 comprises water-proof textile or vinyl materials and is envisioned to be attached thereto the tubular frame members 85 using hook-and-loop or similar fasteners, being sewn along inside and perimeter surfaces of said enclosure 81. The enclosure 81 is further envisioned to be provided in a variety of colors and patterns based upon user's preferences.

The storage sack 83 provides a water-proof cylindrical protective enclosure to the protective cover assembly 80 when disassembled and is envisioned to include expected features such as sealed seams, a carrying handle, a draw string 84, a cord locking device, and the like. The storage sack 83 is further envisioned to be constructed using a soft pliable weather-resistant fabric or extruded plastic sheeting material and introduced in similar colors and patterns as the protective cover assembly 80.

Figure 9:
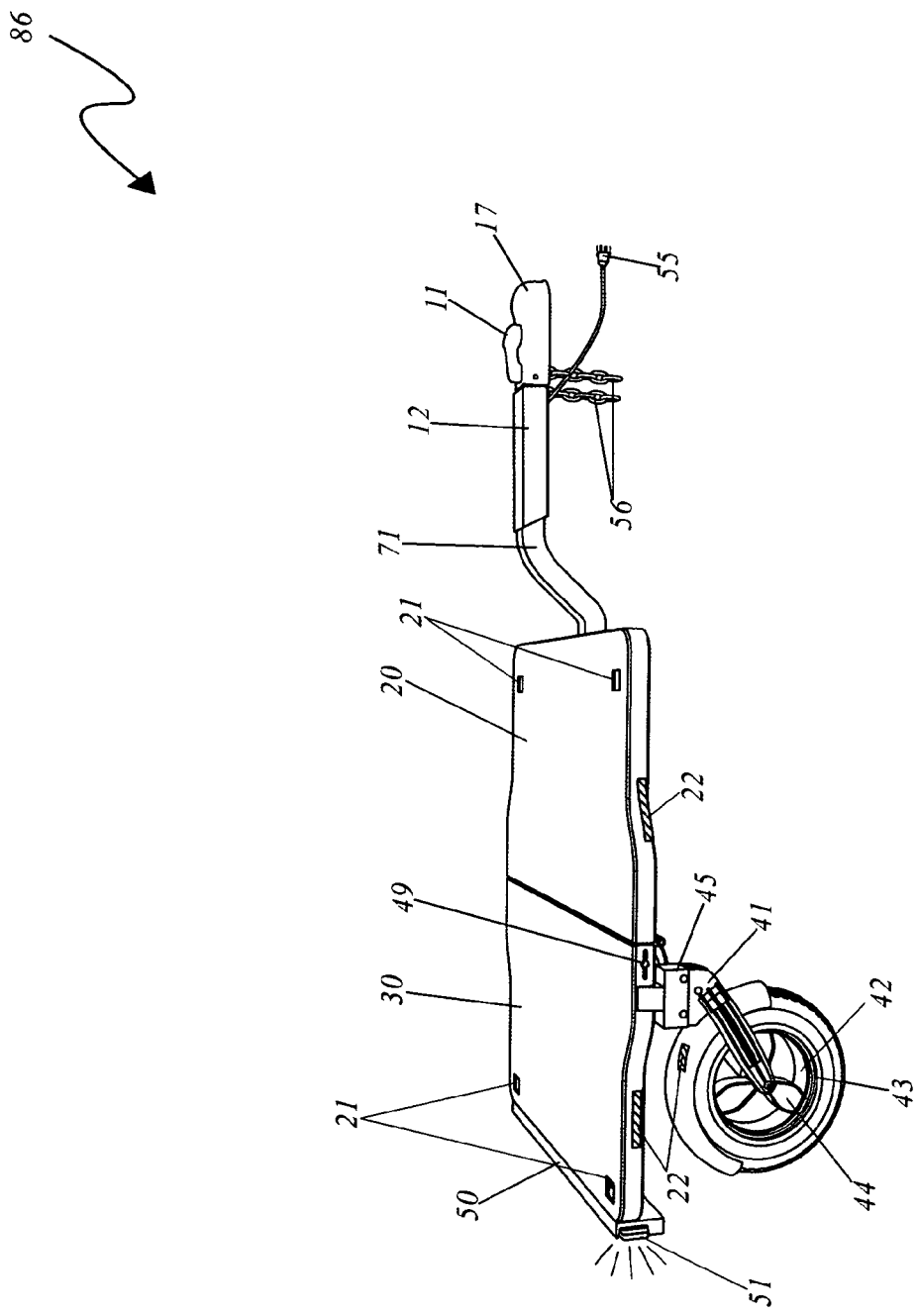
FIG. 9 is a side perspective view of a motorcycle embodiment 86 depicting a motorcycle drawbar 71, according to an alternate embodiment of the present invention.

Referring now to FIG. 9, a side perspective view of a motorcycle embodiment 86 depicting a motorcycle drawbar 71, according to an alternate embodiment of the present invention, is disclosed. The motorcycle drawbar 71 is installed and attached in like manner as the automobile drawbar 70. The motorcycle drawbar 71 provides a coupler/drawbar assembly 12 at an elevated height. The motorcycle drawbar 71 comprises an upward curving "S"-shaped profile providing attachment to a motorcycle so as to clear a rear tire portion of said motorcycle. The motorcycle drawbar 71 is envisioned to comprise all components and functionality as the aforementioned automobile drawbar 70. The motorcycle drawbar 71 is further envisioned to be introduced in a variety of different arcuate profiles being correspondingly suitable to various makes and models of motorcycles on the market.

Referring now to FIG. 10, a side perspective view of a garden cart embodiment 87 depicting a garden-cart drawbar 72 and hard wagon sides 93, according to alternate embodiments of the present invention, is disclosed. The garden-cart drawbar assembly 72 provides a manual means to manually direct and propel the apparatus 10 locally over paved surfaces or terra firma. The garden-cart drawbar assembly 72 comprises a pivoting garden-cart dolly 73, a pair of garden-cart wheels 74, and a wagon pull handle 96. The garden-cart drawbar assembly 72 is installed and attached thereto the apparatus 10 in like manner as the automobile drawbar 70. The garden-cart drawbar 72 comprises a downward curving "S"-shaped profile extending outward and attached thereto a garden-cart dolly 73. The garden-cart dolly 73 comprises similar construction as the front wheels of a child's play wagon providing large rubber treaded wheels 74 and expected features such as a vertical turning axle, a thrust bearing, and a swiveling and vertically pivoting pull-handle 96 providing common gripping and pulling features.

The hard wagon sides 93 provide a containing and protective enclosure for the transport of less stable equipment and materials thereupon the apparatus 10 such as gravel, sand, or the like. The hard wagon sides 93 comprise continuous side panels further comprising a plurality of horizontal wagon slats 94 along all four (4) sides. The hard wagon sides 93 are further envisioned to comprise a rear dumping gate 97 comprising upper hinging and lower latching features in an expected manner. The wagon slats 94 are envisioned to be made using durable materials such as wood, vinyl, fiberglass, composite materials, or the like, being attached thereto the apparatus 10 via a series of internal vertical stake poles 95 using a plurality of common attachment/fasteners 100. Said vertical stake poles 95 comprise male features at a lower portion thereof being particularly sized so as to insert therein the aforementioned stake pole apertures 21. The wagon slats 94 are depicted here without gaps therebetween; however, it is envisioned that said wagon slats 94 may be introduced with gaps or as single-piece continuous panels and as such should not be interpreted as a limiting factor of the present invention 10.

Figure 11:
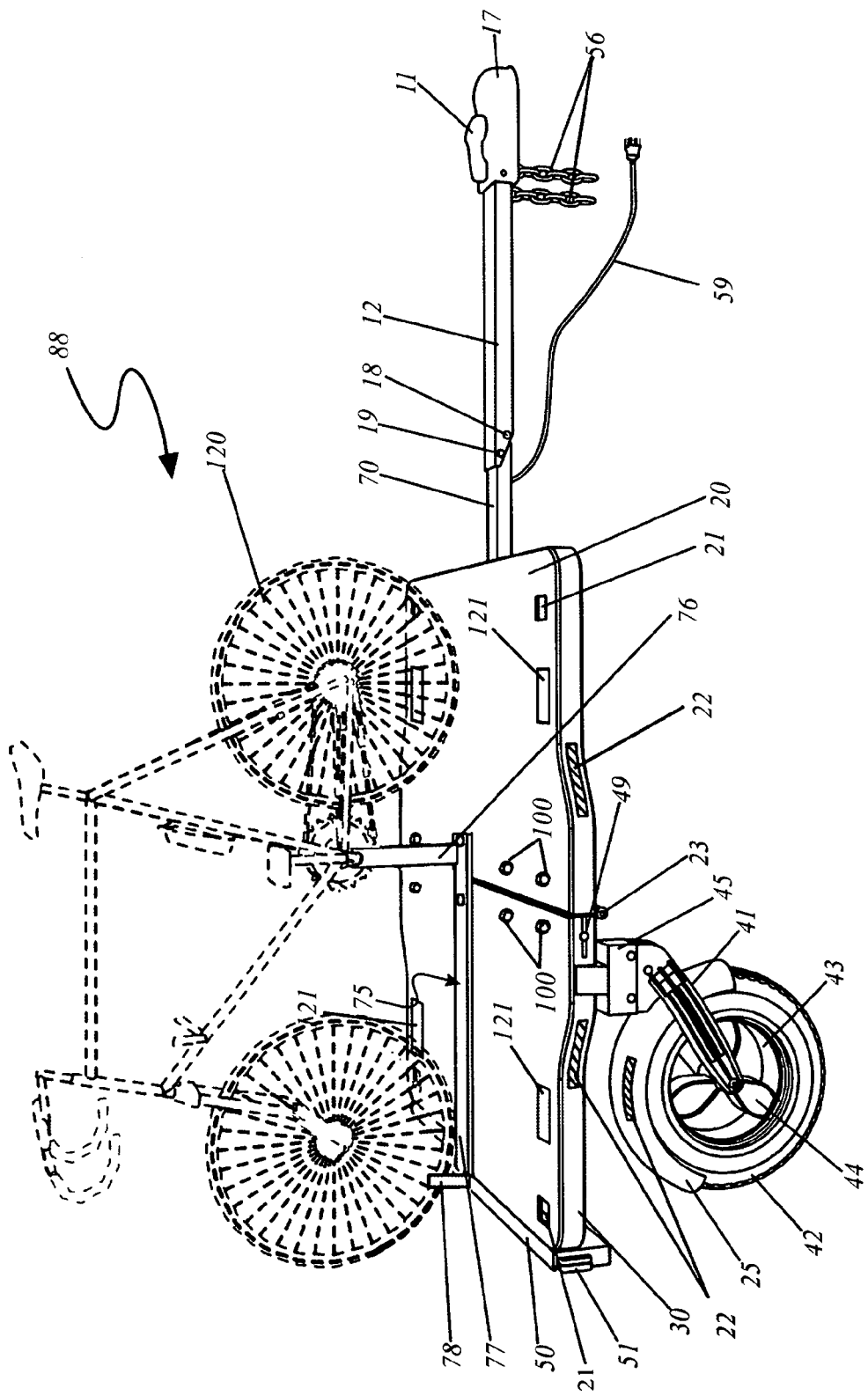
FIG. 11 is a side perspective view of a bicycle carrier embodiment 88 depicting a bicycle carrier 75, according to an alternate embodiment of the present invention.

Referring now to FIG. 11, side perspective view of a bicycle carrier embodiment 88 depicting a bicycle carrier 75, according to an alternate embodiment of the present invention, is disclosed. The bicycle carrier 75 comprises a sturdy three-piece assembly comprising a vertical plate 76, a horizontal plate 77, and a bicycle attachments mechanism 78. Said plates 76, 77 are envisioned to provide an adjustable support means thereto a variety of bicycle styles 120 being made using light weight materials such as steel or aluminum plate and joined using attachment methods such as welding or a plurality of corrosion-resistant attachment/fasteners 100. The vertical plate 76 comprises a slotted female feature along a top portion therein providing a captivating profile thereto a bicycle crank portion 120. The front 20 and rear 30 platforms provide an attachment means thereto the bicycle carriers 75 via a plurality of attachment/fasteners 100 located along a separation line therebetween the front 20 and rear 30 platforms. The apparatus 10 is illustrated here showing four (4) pairs of attachment/fasteners 100; however, any number of bicycle carriers 75 and corresponding attachment/fasteners 100 may be provided and as such should not be interpreted as a limiting factor of the invention 10. The bicycle carrier 75 further comprises an attachment means to the rear platform 30 via a bicycle attachment mechanism 78 providing a secure attachment thereto a rearward edge of the rear platform 30 envisioned to comprise a common swivel latch and wing-nut device. Additionally, said platforms 20, 30 comprise four (4) slots 121 providing additional mounting means thereto said bicycles 120 and bicycle carriers 75 thereto the platforms 20, 30 using common fastening devices such as latches, strap and buckle assemblies, corrosion-resistant attachment/fasteners 100, bungee-cords, ratcheting tie-downs, hook-and-loop straps, or the like as required.

Figure 12:
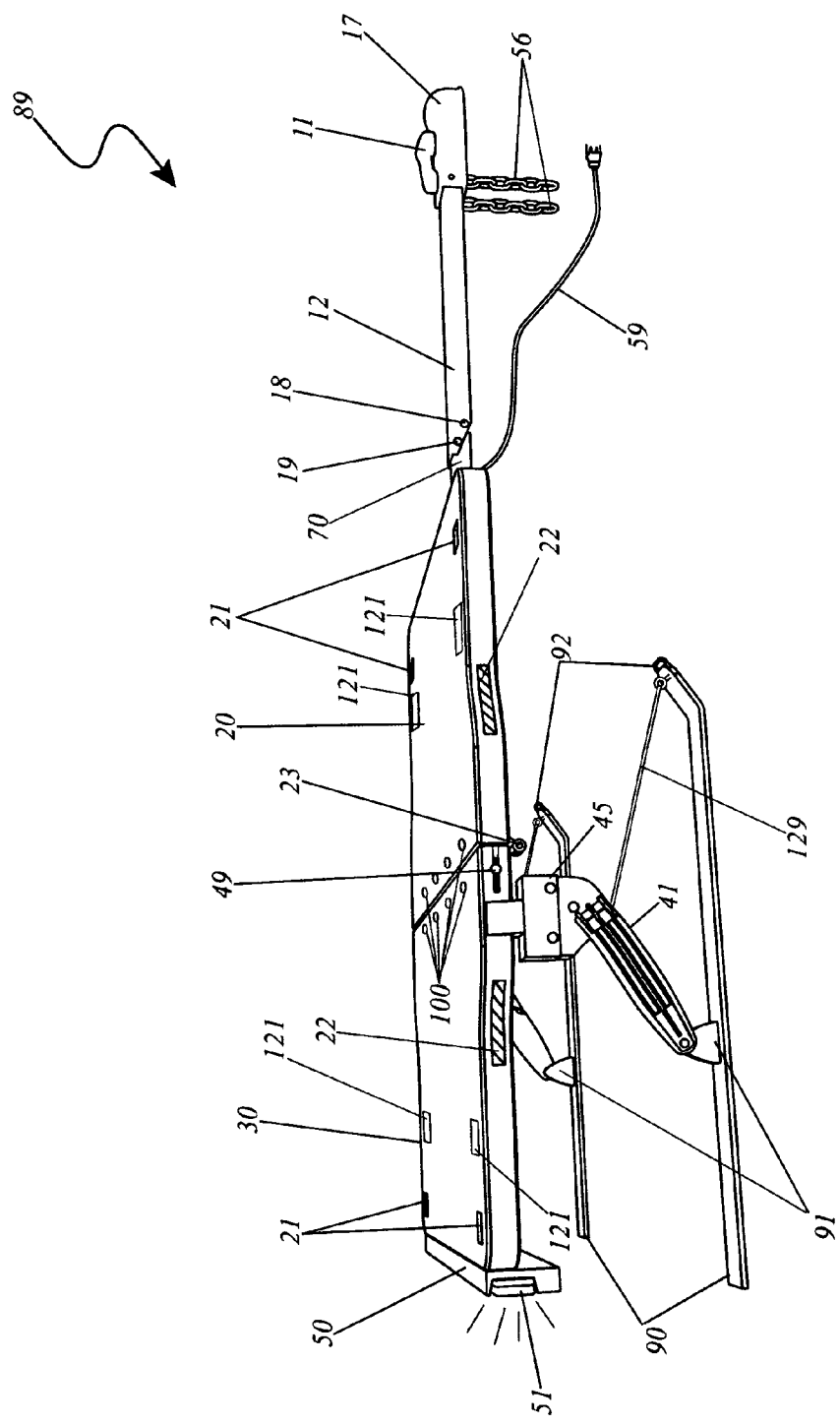
FIG. 12 is a side perspective view of a snow/ski embodiment 89 depicting a snow ski 90 configuration, according to an alternate embodiment of the present invention.

Referring now to FIG. 12, side perspective view of a snow/ski embodiment 89 depicting a snow ski 90 configuration, according to an alternate embodiment of the present invention, is disclosed. The apparatus 10 is depicted here utilizing a pair of commercially available replacement snowmobile skis 90 comprising attachment brackets 91, front hoops 92 for manually manipulating said skis 90, and a pair of flexible ski straps 129 to maintain said skis 90 in a level position during use. The flexible ski straps 129 are envisioned to comprise common rubber or cloth-covered rubber cords fastened thereto the skis 90 using common hooks or eyelets. It is envisioned that all other features and functions of the apparatus 10 are to be similar to the preferred embodiment of the apparatus 10.

Figure 13A:
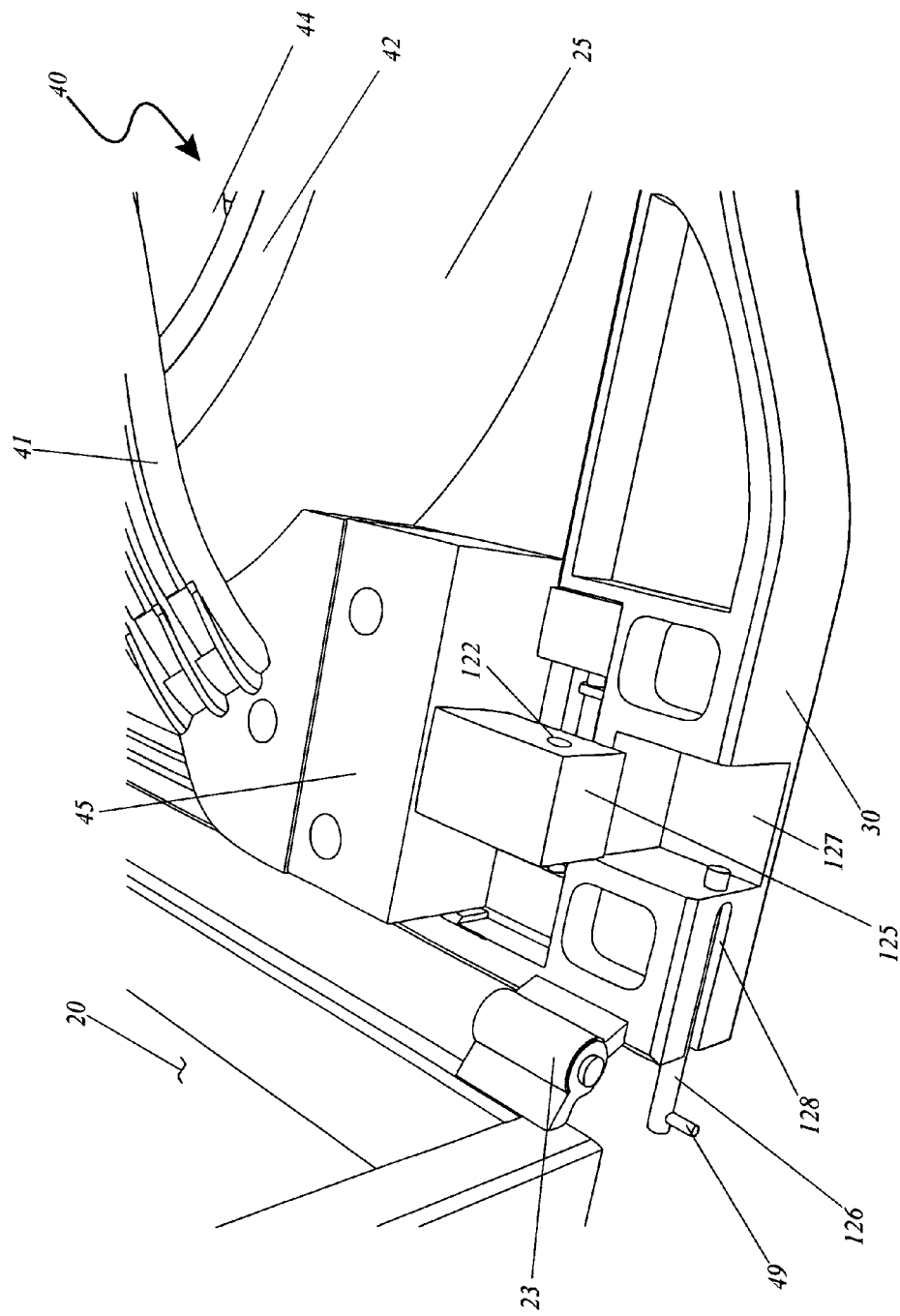
FIG. 13a is a close-up view of a wheel suspension assembly 40 depicting an unlatched state, according to a preferred embodiment of the present invention; and, FIG. 13b is a close-up view of a wheel suspension assembly 40 depicting a latched state, according to a preferred embodiment of the present invention.
Figure 13B:
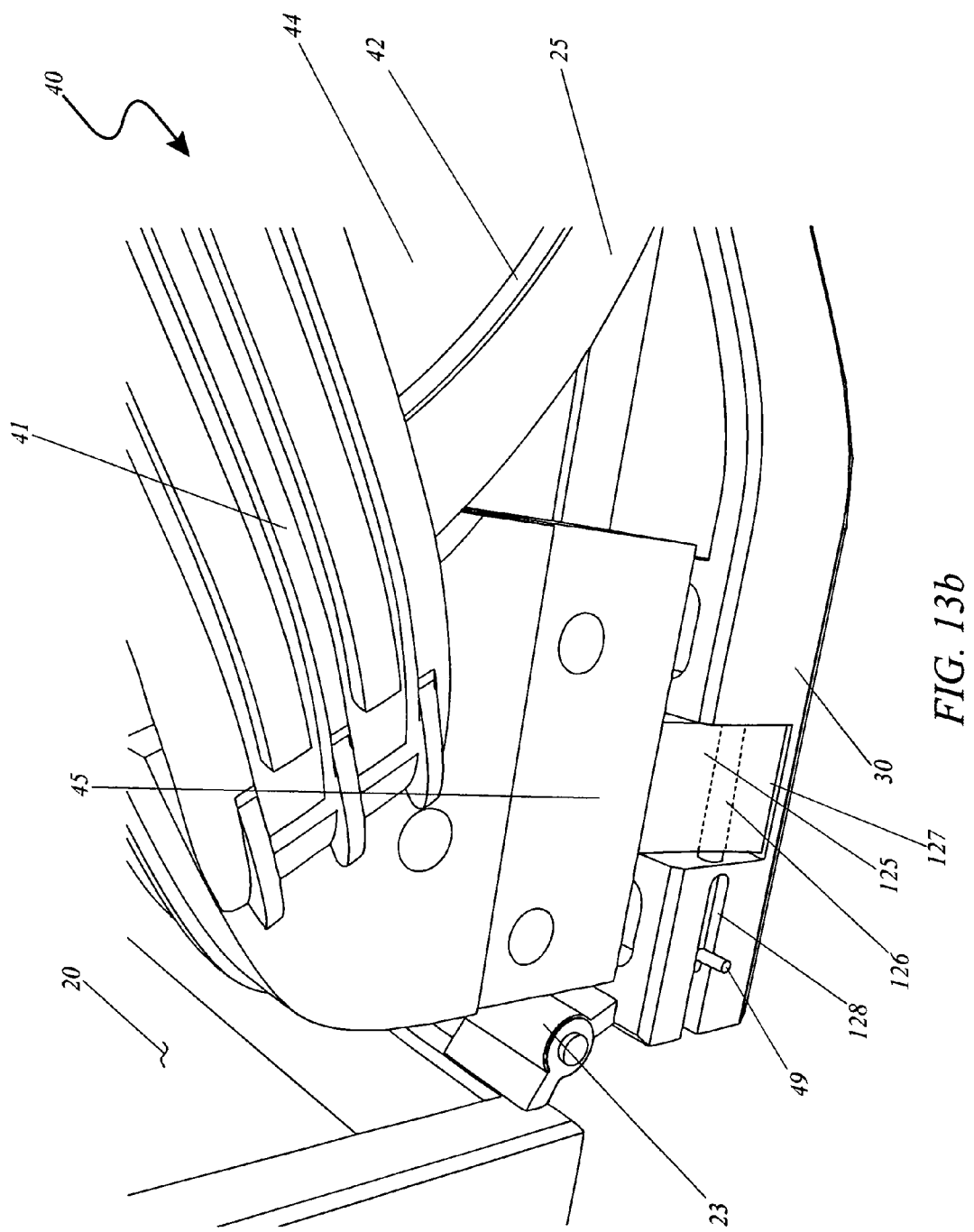

Referring now to FIGS. 13a and 13b, close-up views of a wheel suspension assembly 40 depicting latched and unlatched states, according to a preferred embodiment of the present invention, are disclosed. The wheel suspension assembly 40 comprises a locking bar 125, a locking bolt aperture 122, a second locking mechanism 49, a locking bolt 126, a locking receiver 127, and a suspension housing 45. The second locking mechanism 49 provides an external manual manipulation means thereto the locking bolt 126 being similar thereto a locking bolt commonly used on doorways. The second locking mechanism 49 is affixed thereto the locking bolt 126 via a press fit or threaded connection. The second locking mechanism 49 comprises a dowel pin approximately one-quarter (¼) inch in diameter which protrudes perpendicularly outward and extending therethrough a locking groove 128 allowing a lateral sliding motion of the second locking mechanism 49 within the locking groove 128. Lateral movement of the second locking mechanism 49 causes said locking bolt 126 to move back-and-forth being slidingly inserted therein the locking bolt aperture 122 which comprises a laterally drilled hole therethrough the locking bar 125 across a rectangular locking receiver 127 formed along a forward outer edge of the rear platform 30. Said locking receiver 127 provides a female rectangular cavity so as to snuggly receive the locking bar portion 125 of the suspension housing 45. While the wheel/suspension assembly 40 is in the deployed and perpendicular position, the locking bar 125 is positioned therewithin the locking receiver 127, respectively. Said locking bolt 126 is slidingly inserted therein the locking bolt aperture 122 may be slidingly inserted therein an integral bored hole located therein the rear platform 30, thereby locking the locking bar 125 and wheel/suspension assembly 40 into a deployed position being perpendicular to the rear platform 30 as illustrated in FIG. 13b. While in the locked position, the locking bolt 126 is hidden, thereby allowing the front platform 20 to rotate about the second pivots 23 thereinto a coplanar position with regards to the rear platform 30.

It is envisioned that other styles and configurations of the present invention can be easily incorporated into the teachings of the present invention, and particular configurations shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1. When the device is first procured it is envisioned to be in the folded configuration (see FIG. 5).

The method of installing and utilizing the preferred embodiment of the apparatus 10 may be achieved by performing the following steps: placing the apparatus 10 on the ground with the rear platform 30 top surface contacting the ground; partially deploying the front platform 20 forming a right-angle thereto the rear platform 30 using the second pivots 23; pushing and releasing the second locking mechanisms 49 toward the front platform 20 to allow the wheel/suspension assemblies 40 to be fully deployed and in a perpendicular position; pushing the wheel/suspension assemblies 40 into position; sliding the second locking mechanism 49 away from the front platform 20, thereby securing the wheel/suspension assemblies 40 in a deployed position; deploying the front platform 20 to a coplanar position therewith the rear platform 30; securing the platforms 20, 30 to one another using the provided attachment/fasteners 100 along the common vertical edge surface; inserting the automobile drawbar assembly 70 into the drawbar receiver 61; engaging the female electrical receptacle 57 thereto the male electrical receptacle 58; engaging the drawbar mounting brackets 67 drawbar pins 122 therein the drawbar bracket pin latches 123; securing said drawbar 70 by grasping the drawbar latch handle 66 and pulling in an upward direction to engage the drawbar latch 63 therein the drawbar latch aperture 62; securing the drawbar latch position 63 by fully inserting the drawbar latch locking pin 65 within the corresponding slot; securing the forward portion of the automobile drawbar 70 by connecting the drawbar mounting bracket 67 to the drawbar bracket latches 123 front edge of the front platform 20 using the provided attachment/fasteners 100; applying a pulling force on the drawbar latch locking pin 65 and the automobile drawbar 70 to insure a safe connection; lifting the automobile drawbar 70 and tilting the apparatus 10 forward until the tires 42 engage the ground and the platforms 20, 30 are parallel thereto a ground surface; attaching the apparatus 10 to a towing vehicle 110 using a standard 1⅞ inch ball hitch by pulling up on the coupler locking handle 11 to lift the apparatus 10 and direct the coupler/drawbar assembly 12 onto the ball hitch; pressing down on the coupler locking handle 11 until secured and the integral safety lock is inserted and secure; installing the license plate light assembly 52 by attaching the two (2) wing nuts 54; connecting license plate light assembly wiring 52 to the vehicle electrical cable 59; attaching the safety chains 56 located on either side of the automobile drawbar 70 near the coupler locking handle 11 to an undercarriage portion of the vehicle 110 in accordance with common federal, state, and local transportation regulations; tilting the apparatus 10, as desired, by releasing the first locking mechanism 19 allowing the apparatus 10 to tilt backward rotating about the first pivot 18 enabling a user to easily load items onto the platform portions 20, 30; applying the protective cover assembly 80 to the apparatus 10 by; assembling the tubular frame 85; inserting the tubular frame 85 thereinto the enclosure 81; attaching the enclosure 81 thereto the front 20 and rear 30 platforms using the enclosure straps 82 and slots 121; disassembling the apparatus 10 by performing the instructions above in a reversed order; storing and/or transporting the apparatus 10 within most conventional automobile trunks 110; and, benefiting from the portability and compactness of the present invention 10.

Installation and utilization of an alternate motorcycle embodiment 86 of the invention incorporating a motorcycle drawbar assembly 71 may be achieved by performing the following additional steps: inserting the motorcycle drawbar assembly 71 into the drawbar receiver 61 in lieu of the automobile drawbar assembly 70 using the same steps as described above; connecting the apparatus 10 ball-hitch equipped motorcycle.

Installation and utilization of an alternate garden-cart embodiment 87 of the invention incorporating a garden-cart drawbar assembly 72 with the hard wagon sides 93 may be achieved by performing the following steps: inserting the garden-cart drawbar assembly 72 into the drawbar receiver 61 in lieu of the automobile drawbar assembly 70 using the same steps as described above; installing the hard wagon sides 93 by inserting the wagon stake poles 95 into the stake pole apertures 21; assembling the wagon slats 94 to the wagon stake poles 95 using the provided attachment/fasteners 100, if not previously attached; manipulating the apparatus 10 as desired using the garden-cart dolly 73 and the wagon pull handle 96; dumping a load using the dump-type tailgate 97 as desired.

Installation and utilization of an alternate bicycle carrier embodiment 88 of the invention incorporating a bicycle carrier 75 may be achieved by performing the following steps: assembling the vertical plate 76 along the horizontal plate 77 so as to conform to a particular bicycle length 120; attaching the bicycle carrier 75 thereto the platform surfaces 20, 30 using the provided attachment/fasteners 100; loading a bicycle 120 onto said bicycle carrier 75; placing the bicycle crank portion 120 into the slotted female feature along a top portion of the vertical plate 76; securing the bicycle carrier 75 thereto a rear edge of the rear platform 30 using the bicycle attachment mechanism 78; securing the bicycle 120 thereto the apparatus 10 using additional securing devices as required; attaching additional bicycle carriers 75 to the apparatus 10 as desired in like manner.

Installation and utilization of an alternate snow/ski embodiment 89 of the invention incorporating a snow ski 90 configuration may be achieved by performing the following additional steps: detaching the wheel assemblies 43 from the apparatus 10 by removing the wheels 43 and corresponding axle hardware; attaching the ski brackets 91 thereto the suspension arms 41; reinstalling the axle hardware and securing with provided attachment/fasteners 100; attaching the ski straps 129 therebetween the ski hoops 92 and the suspension arms 41; attaching the coupler/drawbar assembly 12 to a ball hitch equipped snowmobile using the 1⅞ inch ball-coupler 17, the coupler locking handle 11, and the safety chains 56; transporting the apparatus 10 using said snowmobile in an expected manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A portable and adjustable trailer assembly comprising:
   a foldable trailer platform including pivotally attached front and rear platforms;
   a removable drawbar assembly attachable to said trailer platform and an existing vehicle ball hitch assembly respectively, further comprising a foldable drawbar provided with a pivot connection for allowing said drawbar to selectively articulate between folded and unfolded positions;
   a suspension assembly operably coupled to said trailer platform, further comprising:
      a suspension housing;
      a locking mechanism connecting said housing to said rear platform;
      a suspension arm attached to said housing;
      a flexible suspension member connected to said housing and said suspension arm;
      a pair of suspension member anchors affixed to said suspension arm and said housing;
      a pivot connection disposed at said housing; and,
      a wheel having a plurality of propeller spokes radially positioned therein;
      wherein said suspension assembly biases said wheel between stored and deployed states;
      wherein said flexible suspension member provides a resistive force when said housing is pivoted about said pivot connection.

2. The portable and adjustable trailer assembly of claim 1, wherein said suspension assembly further comprises:
   a locking bar coupled to said rear platform and being provided with a locking bolt aperture;
   a second locking mechanism including:
      a locking bolt and a dowel pin perpendicularly conjoined therewith;
      a locking receiver formed within said rear platform;
      a suspension housing abutted against said locking bar and anchored to said rear platform respectively; and, a locking groove formed along an edge of said rear platform for allowing a lateral sliding motion of said second locking mechanism to thereby cause said locking bolt to slidingly move back-and-forth within said locking bolt aperture;

wherein said locking bar is aligned within said locking receiver while said suspension assembly is in a deployed and perpendicular position and thereby permitting said locking bolt to interfit within said locking bolt aperture;

wherein said front platform is rotatable with said rear platform while said locking bar is aligned with said locking receiver.

3. The portable and adjustable trailer assembly of claim 1, wherein said drawbar assembly comprises:

a drawbar receiver connected to said rear platform and having a drawbar latch aperture formed therein; and, an engaging and latching mechanism including:

a drawbar bracket latch and a drawbar latch pivotally connected thereto in such a manner that said drawbar latch is removably inserted into said drawbar latch aperture;

a drawbar latching handle and a drawbar latch locking pin connected thereto, said drawbar latch locking pin being coupled to said drawbar latch bracket; and, a multi-pin female electrical receptacle formed at a distal end of said drawbar assembly and being selectively mated directly into a distal end of said drawbar receiver that is provided with a multi-pin male electrical receptacle such that power is transmitted to tail lights and licensing plate lights of said adjustable trailer assembly.

4. The portable and adjustable trailer assembly of claim 1, further comprising:

a platform stiffener connected to said front platform along a longitudinal centerline thereof and spanning from a forward edge to a rear edge of said front platform;

a drawbar bracket pin latch affixed to said front platform stiffener; and, a drawbar mounting bracket including a pair of "L"-shaped brackets engaged with said drawbar bracket latch.

5. The portable and adjustable trailer assembly of claim 4, wherein said rear platform comprises:

a rear platform stiffener including a plurality of support members diverging forwardly towards said front platform; and, a plurality of platform clips attached to rear inside corners of said rear platform and detachably engaged with corresponding edges of said front platform when said front and rear platforms are engaged together.

6. The portable and adjustable trailer assembly of claim 1, further comprising: a protective cover assembly comprising:

a tubular frame generally corresponding to an outline of said front and rear platforms respectively;

a lower enclosure portion;

a plurality of enclosure straps connecting said lower enclosure to said front and rear platforms respectively;

wherein said front and rear platforms are provided with a plurality of slots that receive said enclosure straps therethrough; and, a storage sack for housing said tubular frame and said lower enclosure portion and said enclosure straps after disassembly.

7. The portable and adjustable trailer assembly of claim 1, wherein said drawbar assembly comprises:

a motorcycle drawbar having an upward curving "S"-shaped profile providing attachment to an existing motorcycle so as to clear a rear tire portion of the existing motorcycle.

8. The portable and adjustable trailer assembly of claim 1, wherein said drawbar assembly comprises:

a garden-cart drawbar having a downward curving "S"-shaped profile;

a pivoting garden-cart dolly connected to said garden-cart drawbar;

a pair of garden-cart wheels coupled to said dolly; and, a pivoting wagon pull handle attached to said dolly.

9. The portable and adjustable trailer assembly of claim 8, wherein said trailer platform comprises:

a plurality of wagon slats providing a protective enclosure for transport of equipment along all sides of said trailer platform; and, a plurality of vertical stake poles attached to said trailer platform.

10. The portable and adjustable trailer assembly of claim 1, further comprising:

a bicycle carrier affixed to an upper surface of said front and rear platforms and including:

a vertical plate including a slotted female top portion directly engaged with a bicycle crank portion;

a horizontal plate coupled to said vertical plate; and, a bicycle attachment mechanism securely attached to a rear edge of said rear platform and including a strap anchored to a front bicycle wheel.

11. The portable and adjustable trailer assembly of claim 1, further comprising: a snow mobile carrier comprising:

a plurality of skis disposed beneath said front and rear platforms;

a plurality of brackets connected to said snow skis;

a plurality of front hoops attached to front ends of said snow skis; and, a pair of flexible ski straps tethered to said front hoops for maintaining said skis in a level position during transport.

12. The portable and adjustable trailer assembly of claim 1, wherein said front and rear platforms are provided with a plurality of stake pole apertures and a plurality of slots registered parallel to outer side edges of said front and rear platforms respectively.

13. A method of installing and utilizing a portable trailer assembly comprising the steps of:

placing a top surface of a rear platform on a ground surface;

partially deploying a front platform by forming a right-angle with said rear platform;

releasing a locking mechanism located adjacent to said front platform;

deploying a wheel assembly to an operating position;

deploying said front platform to a coplanar position with said rear platform;

securing said front and rear platforms to each other;

inserting an automobile drawbar into a drawbar receiver;

engaging a female electrical receptacle with a male electrical receptacle;

engaging a drawbar mounting bracket with a drawbar bracket pin latch;

securing a drawbar by grasping a drawbar latch handle and pulling said drawbar in an upward direction;

engaging a drawbar latch into a draw bar latch aperture;

inserting a drawbar latch locking pin within a corresponding slot;

securing a forward portion of said drawbar by connecting said drawbar mounting bracket to said drawbar bracket latch; and, tilting said front and rear platforms forwardly until at least one wheel engages the ground surface and said front and rear platforms become aligned parallel to the ground surface.

14. The method of claim 13, further comprising the steps of:

attaching said front platform to an existing vehicle;

tilting said front platform by rotating said front platform with respect to said rear platform; and, attaching a protective cover assembly to said front and rear platforms.

15. The method of claim 14, further comprising the steps of:

assembling a tubular frame;

inserting the tubular frame in a plurality of stake pole apertures; and, attaching upper and lower enclosures to the tubular frame.

16. The method of claim 13, further comprising the step of:

inserting a motorcycle drawbar assembly into a drawbar receiver.

17. The method of claim 13, further comprising the steps of:

inserting a garden-cart drawbar assembly into a drawbar receiver;

inserting a plurality of wagon stake poles into a plurality of corresponding stake pole apertures; and, attaching a plurality of wagon slats to the wagon stake poles.

18. The method of claim 13, further comprising the steps of:

attaching a bicycle carrier to said front and rear platforms by assembling a vertical plate along a horizontal plate so as to conform to a particular length of an existing bicycle;

attaching a bicycle carrier to said front and rear platforms;

loading the existing bicycle onto said bicycle carrier;

placing an existing bicycle crank portion into a saddle portion of the vertical plate; and, securing the existing bicycle to said bicycle carrier.

19. The method of claim 13, further comprising the steps of:

detaching the wheel assembly from said rear platform;

attaching a plurality of snow ski brackets to a plurality of suspension arms;

attaching a plurality of ski straps to a plurality of ski hoops and said suspension arms respectively; and, attaching a drawbar assembly to an existing snow mobile.

* * * * *